US012663597B2

(12) United States Patent
Shikama et al.

(10) Patent No.: US 12,663,597 B2
(45) Date of Patent: Jun. 23, 2026

(54) MOUNTING STRUCTURE OF OPTICAL MODULE AND OPTICAL MOUNTING BOARD

(71) Applicant: NTT, Inc., Tokyo (JP)

(72) Inventors: Kota Shikama, Tokyo (JP); Norio Sato, Tokyo (JP); Takeshi Sakamoto, Tokyo (JP)

(73) Assignee: NTT, INC., Tokyo (JP)

( * ) Notice: Subject to any disclaimer, the term of this patent is extended or adjusted under 35 U.S.C. 154(b) by 261 days.

(21) Appl. No.: 18/259,451

(22) PCT Filed: Jan. 12, 2021

(86) PCT No.: PCT/JP2021/000647
§ 371 (c)(1),
(2) Date: Jun. 27, 2023

(87) PCT Pub. No.: WO2022/153354
PCT Pub. Date: Jul. 21, 2022

(65) Prior Publication Data
US 2024/0053553 A1     Feb. 15, 2024

(51) Int. Cl.
*G02B 6/42* (2006.01)

(52) U.S. Cl.
CPC ......... *G02B 6/4261* (2013.01); *G02B 6/4268* (2013.01)

(58) Field of Classification Search
CPC .................................................... G02B 6/3886
See application file for complete search history.

(56) References Cited

U.S. PATENT DOCUMENTS 4,690,495 A * 9/1987 Giannini .................. G02B 6/32
385/74
6,769,812 B1 * 8/2004 Handforth ............ G02B 6/4284
439/930

(Continued)

FOREIGN PATENT DOCUMENTS

JP          2001215362 A      8/2001
JP          2014067835 A      4/2014
WO          2014010035 A1     1/2014

OTHER PUBLICATIONS

Nagase et al., "History of fiber optic physical contact connector for low insertion and high return losses," 2017 IEEE History of Electrotechnolgy Conference (HISTELCON), Aug. 2017. pp. 113-116. As discussed in the specification.

(Continued)

*Primary Examiner* — Rhonda S Peace
(74) *Attorney, Agent, or Firm* — Slater Matsil, LLP

(57) ABSTRACT

An embodiment mounting structure of an optical module includes, in order, a plurality of optical modules, a first optical waveguide component, a first optical connector, a second optical connector, and a second optical waveguide component, in which the first optical connector includes a first magnetic component and accommodates the first optical waveguide component optically connected to the optical modules, the second optical connector includes a second magnetic component and accommodates the second optical waveguide component, and at least one of the first magnetic component or the second magnetic component includes a hard magnetic material, and by causing a magnetic force to act between the first magnetic component and the second magnetic component, an attractive force is applied in a direction in which a gap between facing end surfaces of the first magnetic component and the second magnetic component decreases.

22 Claims, 61 Drawing Sheets

(56) References Cited

U.S. PATENT DOCUMENTS

| | | | | |
|---|---|---|---|---|
| 6,796,716 B1 * | 9/2004 | Handforth | G02B 6/4278 | |
| | | | | 439/157 |
| 8,774,577 B2 * | 7/2014 | Benjamin | G02B 6/4204 | |
| | | | | 385/33 |
| 8,821,036 B2 * | 9/2014 | Shigehara | G02B 6/4249 | |
| | | | | 385/59 |
| 9,869,826 B1 * | 1/2018 | Shang | G02B 6/3886 | |
| 10,976,508 B2 * | 4/2021 | Mathai | G02B 6/4214 | |
| 11,789,215 B2 * | 10/2023 | Sato | G02B 6/3809 | |
| | | | | 385/57 |
| 2010/0080563 A1 * | 4/2010 | DiFonzo | H01R 24/00 | |
| | | | | 398/115 |
| 2013/0108216 A1 * | 5/2013 | Angelov | G02B 6/3806 | |
| | | | | 385/27 |
| 2013/0322830 A1 | 12/2013 | Tan et al. | | |
| 2017/0146750 A1 | 5/2017 | Fortusini et al. | | |
| 2017/0299816 A1 * | 10/2017 | Mitsui | G02B 6/3853 | |
| 2020/0083670 A1 * | 3/2020 | Kim | H01S 5/18361 | |
| 2023/0003950 A1 * | 1/2023 | Shikama | G02B 6/4231 | |
| 2024/0053553 A1 * | 2/2024 | Shikama | G02B 6/3886 | |

OTHER PUBLICATIONS

Sogawa, "Basic Technologies toward the All-Photonics Network," NTT Technical Review, vol. 18, No. 3, Mar. 2020, pp. 24-29. As discussed in the specification.

* cited by examiner

MOUNTING STRUCTURE OF OPTICAL MODULE AND OPTICAL MOUNTING BOARD

CROSS-REFERENCE TO RELATED APPLICATIONS

This application is a national phase entry of PCT Application No. PCT/JP2021/000647, filed on Jan. 12, 2021, which application is hereby incorporated herein by reference.

TECHNICAL FIELD

Embodiments of the present invention relate to a mounting structure of an optical module mounted on an optical mounting board and the optical mounting board.

BACKGROUND

With an explosive increase in Internet traffic due to video services, the Internet of Things (IoT), cloud services, and the like, a significant increase in communication capacity in a data center and between data centers has recently been required. For the purpose of increasing the communication capacity, an optical interconnection technology using an optical transmission technology or the like used in optical communication has increasingly been introduced instead of a conventional short-range communication method using electric signals (Non Patent Literature 1).

In addition, in order to cope with an increase in signal speed also in applications of high performance computing, introduction of optical interconnection has been advanced. In a mounting form of optical interconnection, a method using a pluggable optical transceiver of small form factor pluggable (SFP) or the like is common, but in order to meet a need for further transmission capacity expansion, a mounting form of optical modules called a co-packaged optics (CPO) in which a large number of optical modules are directly mounted near electronic components on a board (substrate) has recently been proposed.

In this mounting form, in order to connect the optical modules within the board or between boards, it is conceivable to connect the optical modules to a plurality of optical fibers, polymer waveguides, or the like, and connect the optical fibers/optical waveguides as transmission lines with an optical connector interposed therebetween. For example, as an optical transception module suitable for CPO, a multi-channel single-mode optical integrated circuit constituted of silicon photonics, a compound semiconductor, or the like is known, and it is conceivable that this optical module and a plurality of optical fibers are optically connected, and the plurality of optical fibers is provided with an MT connector, an MPO connector, or the like, which is a multicore optical connector, at one end to connect the optical connectors to each other. In such applications, it is necessary to mount a plurality of optical modules in the board at a higher density, and therefore a space-saving optical mounting form including the optical connector is required.

As a multicore optical connector used in a CPO form, an MT connector or an MPO connector based on the MT connector is used as described in Non Patent Literature 2. In either case, a resin-molded MT ferrule having a plurality of microholes for accommodating an optical fiber and two guide holes for accommodating/inserting a guide pin is used. A plurality of fibers is bonded and fixed to the same ferrule, and a guide pin provided in one ferrule is fitted to the other ferrule, thereby connecting the optical fibers to each other. At this time, highly accurate positioning of the plurality of optical fibers is collectively achieved by high hole diameter accuracy of an optical fiber accommodation hole and a guide pin hole and high hole positioning accuracy.

CITATION LIST

Non Patent Literature

Non Patent Literature 1: "Basic Technologies toward the All-Photonics Network", Tetsuomi Sogawas, NTT Technical Review, vol. 18, No. 3, 2020.

Non Patent Literature 2: "History of Fiber Optic Physical Contact Connector for Low Insertion and High Return Losses", Ryo Nagase, Yoshiteru Abe, Mitsuru Kihara, Proc. IEEE HISTory of ELectrotechnolgy CONference (HISTELCON), 2017.

SUMMARY

Technical Problem

However, since the multicore optical connector of the present structure uses a spring component such as a clip or a coil spring and a mechanical fastening structure for constantly applying a pressing force of the spring component to the connection end surface, there is a limit in achieving miniaturization while maintaining connection workability so as to contribute to the CPO application.

For example, the MT connector using the clip has a small configuration including the MT ferrule and the clip, but a width of a clip component is often larger than that of the MT ferrule, which hinders miniaturization.

Furthermore, in actual connection of the MT connector, a work space for inserting the clip component so as to sandwich the two ferrules is required, a work space equal to or larger than the connector width is required at the time of insertion and removal, and a connection jig or the like needs to be used as necessary. Accordingly, in a case where a plurality of optical modules and a plurality of MT connectors are arranged in an array as in the CPO form, the clip width and a space width for clip insertion and removal are required, and thus the plurality of MT connectors cannot be arranged densely and needs to be coarsely arranged in consideration of the space. Note that the same applies to a spring component such as a claw having a similar effect to that of the clip.

In addition, in the MPO connector using the coil spring instead of the clip, manual push-pull connection can be achieved by a large number of housing components around the coil spring, and a stable pressing force can be exerted. On the other hand, it is necessary to use a plurality of housing components and an additional adapter component in order to maintain the pressed state against the reaction force of the coil spring and the sizes of these components are large, and consequently, the size of the MPO connector becomes very large.

As described above, in the CPO form, in a case where the plurality of optical modules and the plurality of multicore optical connectors are arranged on the substrate, the multicore optical connector itself and the space for connecting the multicore optical connectors occupy the space on the substrate, and consequently, there has been a problem in mounting the optical modules on the board (substrate) at high density.

Note that a form in which a polymer waveguide including an optical connector at a terminal end is used instead of the plurality of optical fibers and mounted with optical modules has also been studied. In this case, a polymer waveguide connected with a MT connector (PMT connector) accommodated in the MT ferrule is applied as an optical connector for a polymer waveguide, and a connection mechanism thereof is similar to that of the MT connector. Thus, even in a case where the waveguide is used as the transmission line, there has been a problem in mounting the optical modules on the board (substrate) at high density similarly due to the space of a connector connection portion.

Embodiments of the present invention can solve the above problems, and an object thereof is to provide a high-density mounting form of optical modules by saving a space required for connecting an optical connector in a mounting form of a plurality of optical modules arranged on a board in a state of being optically connected to a plurality of short optical fibers provided with the optical connector or a short optical waveguide provided with the optical connector.

Solution to Problem

In order to solve the problem as described above, a mounting structure of an optical module according to embodiments of the present invention including, in order, a plurality of optical modules, a first optical waveguide component, a first optical connector, a second optical connector, and a second optical waveguide component, in which the first optical connector includes a first magnetic component and accommodates the first optical waveguide component optically connected to the optical modules, the second optical connector includes a second magnetic component and accommodates the second optical waveguide component, at least one of the first magnetic component or the second magnetic component includes a hard magnetic material, and by causing a magnetic force to act between the first magnetic component and the second magnetic component, an attractive force is applied in a direction in which a gap between facing end surfaces of the first magnetic component and the second magnetic component decreases.

Advantageous Effects of Embodiments of the Invention

According to embodiments of the present invention, it is possible to provide a mounting structure of an optical module capable of high-density mounting.

BRIEF DESCRIPTION OF THE DRAWINGS

FIG. 2A is a perspective schematic view illustrating optical connectors (before connection) in the mounting structure of the optical module according to the first embodiment of the present invention.

FIG. 2B is a perspective schematic view illustrating the optical connectors (after connection) in the mounting structure of the optical module according to the first embodiment of the present invention.

Figure 3A:
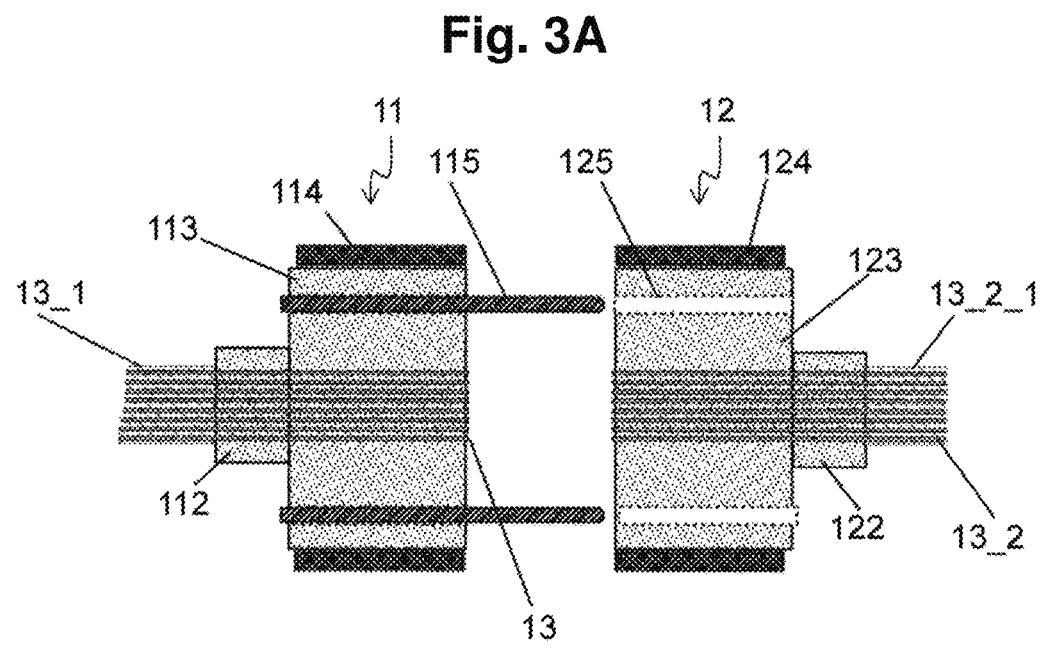

FIG. 3A is a top cross-sectional view illustrating the optical connectors (before connection) in the mounting structure of the optical module according to the first embodiment of the present invention.

FIG. 4B is a perspective schematic view illustrating optical connectors (after connection) in the mounting structure of the optical module according to the modification of the first embodiment of the present invention.

FIG. 5A is a front cross-sectional view illustrating an example of the optical connector in the mounting structure of the optical module according to the first embodiment of the present invention.

FIG. 5C is a front cross-sectional view illustrating an example of the optical connector in the mounting structure of the optical module according to the first embodiment of the present invention.

FIG. 5I is a front cross-sectional view illustrating an example of the optical connector in the mounting structure of the optical module according to the first embodiment of the present invention.

FIG. 5J is a front cross-sectional view illustrating an example of the optical connector in the mounting structure of the optical module according to the first embodiment of the present invention.

FIG. 5K is a front cross-sectional view illustrating an example of the optical connector in the mounting structure of the optical module according to the first embodiment of the present invention.

FIG. 7D is a side sectional view illustrating an example of the optical connector in the mounting structure of the optical module according to the first embodiment of the present invention.

FIG. 7E is a side cross-sectional view illustrating an example of the optical connector in the mounting structure of the optical module according to the first embodiment of the present invention.

FIG. 7F is a side cross-sectional view illustrating an example of the optical connector in the mounting structure of the optical module according to the first embodiment of the present invention.

FIG. 9 is a perspective schematic view illustrating an example of the optical connectors in the mounting structure of the optical module according to the first embodiment of the present invention.

FIG. 17B is a perspective schematic view illustrating the mounting structure (after connection) of the optical module according to the sixth embodiment of the present invention.

DETAILED DESCRIPTION OF ILLUSTRATIVE EMBODIMENTS

First Embodiment

A mounting structure of an optical module according to a first embodiment of the present invention will be described with reference to FIGS. 1A to 9.

Configuration of Mounting Structure of Optical Modules

Figure 1A:
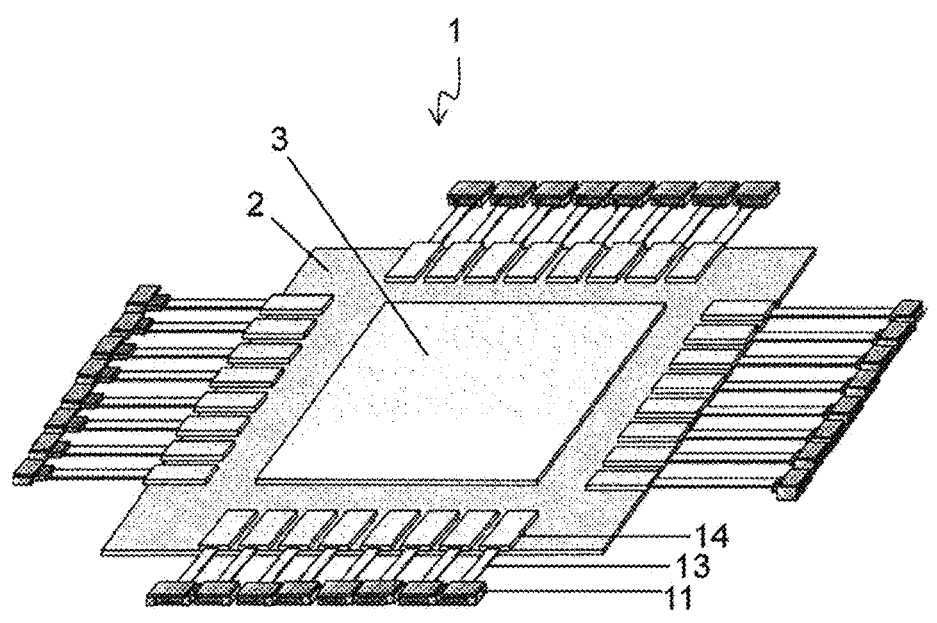
FIG. 1A is a perspective schematic view of an optical mounting board including a mounting structure (before connection) of an optical module according to a first embodiment of the present invention.

As illustrated in FIG. 1A, the mounting structure of optical modules (hereinafter referred to as "mounting structure") according to the present embodiment is used for mounting optical modules on an optical mounting board 1.

The optical mounting board 1 includes a mounting structure 10 according to the present embodiment, a substrate 2, and an integrated circuit 3.

In the optical mounting board 1, the integrated circuit 3 is mounted near the center of the substrate 2, and a plurality of optical modules 14 is mounted on the same substrate 2 around the integrated circuit 3.

Before connection between first optical connectors 11 and second optical connectors 12, as illustrated in FIG. 1A, the optical mounting board 1 includes the optical modules 14 in the mounting structure 10, first optical fibers 13 that are first optical waveguide components, and first optical connectors 11.

Figure 1B:
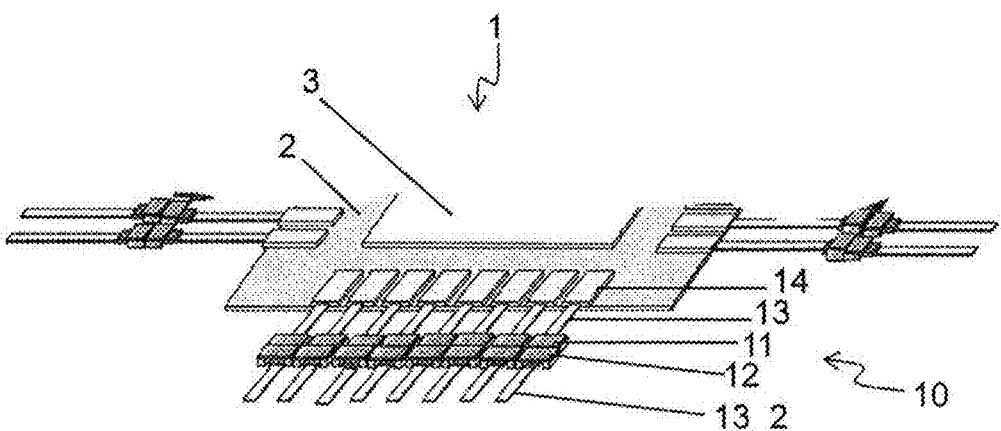
FIG. 1B is a perspective schematic view illustrating the mounting structure (after connection) of the optical module according to the first embodiment of the present invention.
Figure 3B:
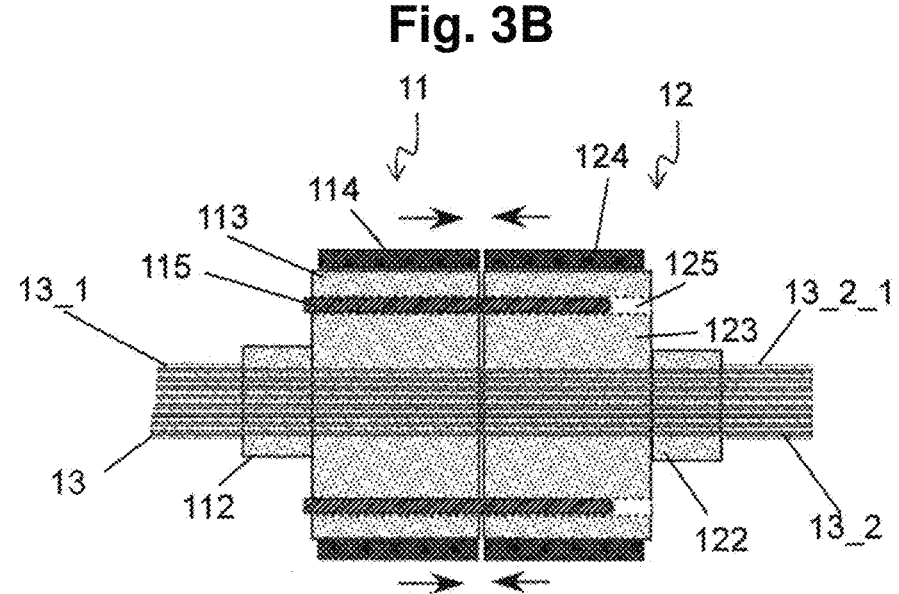
FIG. 3B is a top cross-sectional view illustrating the optical connectors (after connection) in the mounting structure of the optical module according to the first embodiment of the present invention.

The second optical connectors 12 to which second optical fibers 13_2 that are second optical waveguide components are connected are connected to the first optical connectors 11 as illustrated in FIG. 1B. Note that, in FIG. 1B, only one side and parts of two sides of FIG. 1A are illustrated, and the other side is omitted. The same applies to the following drawings.

As described above, the mounting structure 10 according to the present embodiment includes the optical modules 14, the first optical fibers 13, the first optical connectors 11, the second optical connectors 12, and the second optical fibers 13_2. Further, hereinafter, the direction of the optical fibers accommodated in the optical connectors according to embodiments of the present invention is referred to as a "longitudinal direction of the optical fibers".

Here, as illustrated in FIGS. 1A and 1B, the first optical fibers 13 and the second optical fibers 13_2 may be a plurality of optical fibers (hereinafter also referred to as "optical fiber group") or may be optical waveguides. Here, the optical fibers and the optical fiber group are illustrated as an example of optical waveguide components. Examples of the optical waveguide components include an optical waveguide and an optical element.

First, various basic components of embodiments of the present invention will be described in detail with reference to FIGS. 1A and 1B.

The integrated circuit 3 is, for example, an application specific integrated circuit (ASIC) switch, and is appropriately used according to applications to which optical interconnection and computing are applied, such as various processors (collectively referred to as xPUs) such as a central processing unit (CPU) and a graphics processing unit (GPU), a digital signal processor (DSP), or a field-programmable gate array (FPGA).

The substrate 2 is, for example, an electric substrate including high-frequency electrical wiring such as a known printed substrate, a build-up (BU) substrate, or a ceramic substrate, and although not illustrated, a plurality of various electric components such as a capacitor, a coil, a resistor, an electric connector, and an electric contact is integrated. In a case where a BU substrate or the like is used, the BU substrate or the like may be separately mounted on a second parent substrate such as a printed circuit board.

The optical modules 14 include an aggregate of various optical elements constituting an optical transceiver and various electrical elements for photoelectric conversion. The optical elements are, for example, an optical circuit, an optical light emitting element, an optical light receiving element, an optical modulation element, and an optical functional element.

The optical light emitting element is a known distributed feedback (DFB) laser array, distributed bragg reflector (DBR) laser array, or vertical cavity surface emitting laser (VCSEL) array, and the optical light receiving element is a photo detector (PD) array or the like.

The optical modulation element includes, for example, any of an element directly modulated on the optical light emitting element, an element obtained by integrating an electro-absorption (EA) modulator, or an external modulation element including a Mach-Zehnder interference circuit or a ring modulator circuit.

Examples of the optical functional element include a splitter, a wavelength multiplexer/demultiplexer, an optical switch, a polarization control element, an optical filter, and the like. Any of these can be used as an optical element, and the optical transceiver is constituted of a combination of the various elements with an Si waveguide or the like that is a base of the optical circuit.

A circuit in which various types of the optical light emitting element, the optical light receiving element, the optical modulation element, the optical functional element, and the like are monolithically integrated or hybrid integrated on the Si waveguide is also called a photonic integrated circuit (PIC). The Si waveguide is an optical circuit including a clad portion constituted of $SiO_2$, SiOx, SiN, SiON, or the like around an Si thin wire formed on a BOX layer of a known SOI substrate as a core.

As the optical circuit, in addition to the Si waveguide, an optical circuit constituted of a compound semiconductor such as InP may be used, and in addition, a glass-based waveguide such as a quartz-based planar lightwave circuit, a polymer waveguide, a ferroelectric waveguide such as LN, or the like may be used, and the PIC based on these may be used. By arraying the optical transceiver with a plurality of channels, the transmission capacity can be further increased.

In the vicinity of the optical transceiver, electrical elements for driving and controlling the various optical elements are arranged and electrically connected to the optical transceiver. The electrical element is, for example, a driver circuit for driving an LD or an external modulator, or a transimpedance amplifier circuit for amplifying an electrical input to a PD. In addition, circuits such as a power supply circuit, a retimer circuit, and a clock circuit may be further added.

The electrical connection between the optical transceiver and the electrical element may be any known electrical connection technology such as wire bonding, flip chip bonding, or via electrical wiring of another package substrate.

In addition, the optical element or the PIC includes a light input/output unit for inputting and outputting light to and from the outside corresponding to the plurality of channels of the optical transceiver, and can input and output light to and from the outside by optically connecting this light input/output unit to a plurality of optical fibers, polymer optical waveguides, or the like.

Any known optical connection technology can be applied as the structure of the light input/output unit. For example, there is a method of arranging an optical fiber or an optical waveguide on a connection end surface having the light input/output unit to perform connection such that optical axes of respective waveguide cores coincide with each other as referred to as "edge coupling". A spot size converter unit, a spatial optical system including a lens component, and the like are combined with edge coupling so that respective mode field diameters are matched.

In addition, as called grating coupling, a grating coupler may be integrated in the PIC or the like, and light may be input and output from an upper portion or a lower portion of the PIC. In this case, the optical path conversion unit may also be provided on connection end surfaces of the plurality of optical fibers or optical waveguides. For example, an optical fiber array component in which a bent fiber is incorporated and fixed and a mirror for optical path conversion may be integrated.

In addition, as called adiabatic coupling, an optical connection form in which the PIC and the cores of the optical fibers or the optical waveguides are brought close to each other to cause transition of light in a thermally insulated manner may be employed. In addition, minute polymer wirings may be formed between connection targets and optically connected using an optical shaping technique or the like.

As described above, the optical modules include the optical transceiver optically connected to the optical fibers or the optical waveguides and the aggregate of various electrical elements electrically connected thereto, and these are further electrically connected to the integrated circuit with an electrical wiring and an electrical contact interposed therebetween, which are provided on the substrate on which the integrated circuit is mounted or with another electrical wiring component and an electrical contact interposed therebetween, which are provided on the substrate.

The form in which the optical modules are mounted on the substrate may be any known mounting form as long as it can be electrically connected. For example, the optical transceiver, the electrical elements, or the like in the optical modules can be directly mounted on the substrate, and electrical connection can be performed by wire bonding, flip chip connection, or the like.

Alternatively, the optical transceiver or the electrical elements may be mounted on another package substrate to form optical modules with a package, and the package may be mounted so as to be electrically connected to the substrate. As a method of electrical connection in this case, for example, in addition to wire bonding or flip chip connection, solder connection such as ball grid array (BGA) or land grid array (LGA), or connection via a solder portion such as pin grid array (PGA) or a metal pillar may be used.

Further, a pressing structure may be separately provided in addition to the electric terminals, and the electric terminals may be connected as an electric connector as what is called an electric socket. In this case, the substrate and the optical modules are detachable.

In addition, as the package, an Si interposer in which polyimide or the like incorporating electrical wiring is formed on Si, a similar glass interposer, a ceramic substrate such as alumina or low temperature co-fired ceramics (LTCC), a printed substrate such as another glass epoxy substrate, a metal substrate, or the like may be used.

In addition, an interposer made of a thin film resin having electrical wiring inside the thin film polyimide may be used. At this time, the electrical elements, the PIC, or the like may be molded and protected.

Further, as described later, a lid component may be put on an upper portion, an outer peripheral portion, and the like of the package. The lid component is constituted of, for example, a metal component, and has a role of protecting the electrical element and the optical transceiver. In addition, the optical modules may be thermally connected to the electrical elements, the optical transceiver, or the package with a heat transfer portion interposed therebetween, and may have a function of transferring or dissipating heat generated by the respective elements constituting the optical modules to the outside.

Next, optical fibers to be connected will be described. The type and material of the optical fibers and the type and material of ferrules may be any known type and material. For example, the optical fibers may be any of known quartz-based optical fibers and plastic fibers. In addition, the optical fibers can be any of single mode fibers, multi-mode fibers, polarization maintaining fibers, photonic crystal fibers, multicore fibers, and the like.

In addition, although peripheries of the optical fibers are coated, in a portion other than the inside of the microhole of the ferrule, a known resin coating (for example, acrylic, epoxy, silicone, polyimide, or the like) may be provided in a periphery thereof, and a silicone tube, a nylon coating, or the like may be further provided in double or more in a periphery thereof. Naturally, in a case of multicore fibers, the optical fibers can be handled more easily by using a known tape fiber that is formed into a tape and bundled.

Similarly, instead of the plurality of optical fibers, an optical waveguide having a core and a clad corresponding to a plurality of channels of an optical transceiver in the PIC may be used. The optical waveguide is constituted of, for example, a polymer resin, and is constituted of, for example, a resin in which the refractive index of a core clad is adjusted.

As the material of the polymer waveguide, any known waveguide material may be used. For example, an epoxy resin, an acrylic resin, a silicone resin, a polyimide resin, a polynorbornene resin, a polyoxetane resin, an organic-inorganic hybrid resin, or the like may be used, or a halogen-substituted product obtained by fluorinating, chlorinating, or brominating the resin may be used.

In addition, any of derivatives having a partially modified chemical structure based on the resin, or the like may be used. Of course, either the single mode waveguide or the multi-mode waveguide may be used, and the waveguide core interval and the number of channels can also be arbitrarily applied.

In addition to the polymer waveguide, a glass-based waveguide having a core in glass may be used. As the waveguide other than the polymer, thin film glass is preferable from the viewpoint of flexibility, and in this case, for example, it is sufficient if a waveguide or the like is formed by changing the refractive index by light induction or the like.

The plurality of optical fibers or optical waveguides is provided with an optical connector (first optical connector) 11 at one end on the opposite side different from one end connected to the optical module.

The optical connector is, for example, a ferrule including a plurality of microholes having an inner diameter slightly larger than the outer diameters of the optical fibers (for example, about 0.5 to 1.5 μm), and is, for example, a known MT ferrule.

The optical connector separately has a positioning structure, and the positioning structure includes, for example, two guide pins (male side) and guide pin holes (female side) at both ends as used in connection of the MT connector. When the optical connector is connected, the guide pins included in one ferrule is inserted into the other ferrule, thereby achieving highly accurate positioning of the optical fibers.

The optical fibers from which the coating has been removed are accommodated in the microholes in the optical connector, and the optical fibers and the ferrule are fixed by an adhesive. Note that illustration of the adhesive is omitted in the drawings.

Further, connection end surfaces of the optical fibers and the ferrule are plane-polished so as to be substantially flush with each other. The connection end surfaces of the optical fibers may be polished so as to slightly protrude from the ferrule end surface and become a convex spherical surface. The polishing angle may be a right angle or a known oblique end surface angle.

The optical fibers are arranged at a pitch of, for example, approximately 250 μm, and the number of optical fibers is eight in the drawing. Naturally, the pitch and the number of cores are arbitrary corresponding to the number of channels of the optical module, and any number of cores such as two cores, four cores, eight cores, 12 cores, 16 cores, 24 cores, and 32 cores can be applied.

Although the peripheries of the optical fibers are coated, a known resin coating (for example, acrylic, epoxy, silicone, polyimide, or the like) is arranged around a portion other than insides of the microholes of the ferrule, and the optical fibers are further collected as a plurality of tape fibers.

In addition, a boot component integrated with the ferrule may be separately provided to protect the fiber. The boot portion is a known boot portion used for assembly of an MT connector or the like, and the boot portion may be omitted as necessary.

In addition, a separate component, a joining material, or the like may be provided on the male-side ferrule to fix the guide pins so as to prevent the guide pins from falling off as necessary. In addition, although not illustrated in the drawings, the guide pin hole, the microholes, and the vicinity of the tip of the guide pin may be tapered to facilitate insertion as necessary.

Note that, as described later, the form of the multicore optical connector is not limited to the MT ferrule, and any known optical connector that achieves multicore connection of optical fibers can be applied. For example, a plurality of microholes may be provided in a cylindrical ferrule used for a single core connector to fix the fiber. In addition, a structure known as a fan-in/fan-out structure for multicore fibers, for example, a structure in which a plurality of optical fibers is filled and arranged in one microhole and fixed may be used.

In a case of using the cylindrical ferrule, it is sufficient if two facing ferrules are aligned and held with a split sleeve or the like interposed therebetween, which is known as a single core connector, as an adapter. At this time, the optical fibers accommodated in one optical connector may be the multicore fibers.

Further, as the material of the multicore ferrule, any of general-purpose plastic, engineering plastic, super engineering plastic, and the like that are often used for MT ferrules may be used.

In addition, a processed product based on any material such as a glass material, a semiconductor material, or a ceramic material may be used with a similar structure.

For example, as in a known optical fiber array, a ferrule structure constituted of a glass material having a positioning structure may be formed by applying a structure in which optical fibers are accommodated in a glass V-shaped groove, and a lid component is placed on the optical fibers and fixed with an adhesive, and positioning the two guide pins and the like at predetermined positions on both ends and bonding in a periphery thereof.

Similarly, as the alignment structure, in addition to the alignment structure by the guide pins used in the MT ferrule or the like, a protrusion or the like may be formed on or attached to one of the ferrule end surfaces, and a guide groove or the like adapted to the protrusion may be provided on one of the ferrule end surfaces, like fitting of a notch and a groove. In addition, fitting of outer shapes or the like may be used, and any fitting structure or the like can be applied as long as the same accuracy can be secured.

In addition, even in a case where a waveguide such as a polymer waveguide is used instead of the plurality of optical fibers, similarly, by providing a rectangular groove or a rectangular hole for accommodating the polymer waveguide in the MT ferrule and fixing the waveguide in the ferrule, the ferrule and the polymer waveguide can be integrated to have a similar optical connector structure as in a known polymer waveguide connected with MT connector (PMT connector).

A magnetic component (first magnetic component 114 and second magnetic component 124) is arranged around or inside each of the optical connectors (first optical connector 11 and second optical connector 12) connected to face each other, and is coupled to the ferrule. The magnetic component is constituted of either a permanent magnet which is a hard magnetic material or a soft magnetic material (for example, a magnetic metal attached to a magnet), or a composite of the hard magnetic material and the soft magnetic material.

When at least one of the first magnetic component 114 or the second magnetic component 124 facing each other in the first optical connector 11 and the second optical connector 12 is a permanent magnet made of the hard magnetic material, a magnetic force can be made to act between the facing magnetic components. Note that, in a case where it is not necessary to attach and detach the optical connectors to and from each other, the magnetic components may be permanently connected with an additional mechanical component, an adhesive, or the like as necessary. Note that the structure, material, and effect of the magnetic component will be described later.

Hereinafter, details of the mounting structure 10 according to the present embodiment will be described. In the mounting structure 10, a plurality of short optical fibers 13 is respectively drawn out from the plurality of optical modules 14, and the first optical connectors 11 are provided at end portions thereof (FIG. 1A). The similar second optical connectors 12 are connected to the optical connectors by facing the optical connectors (FIG. 1B).

Figure 2A:
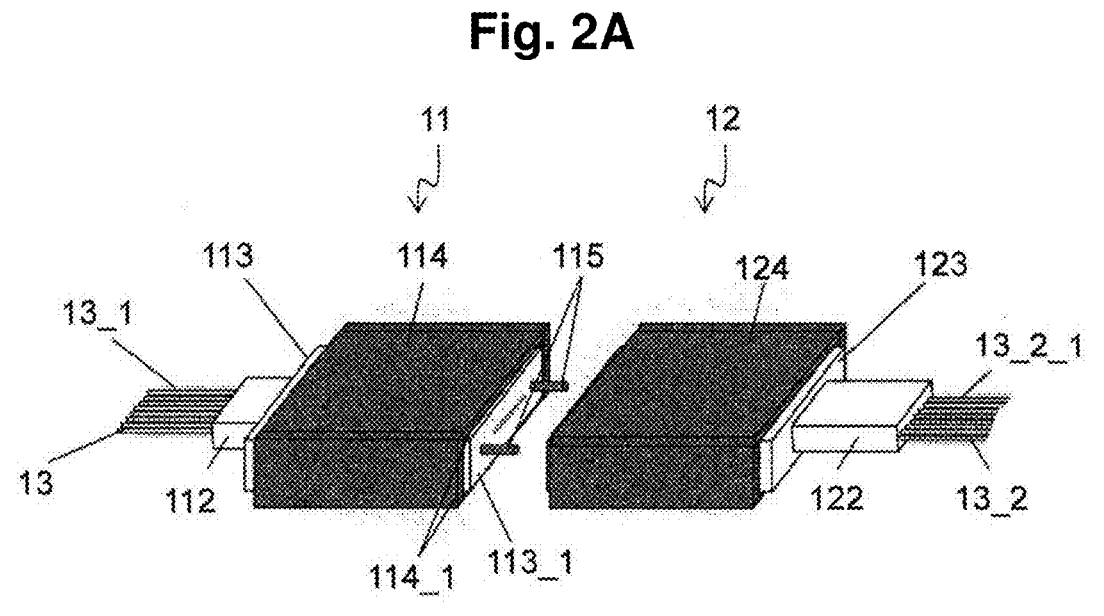
Figure 2B:
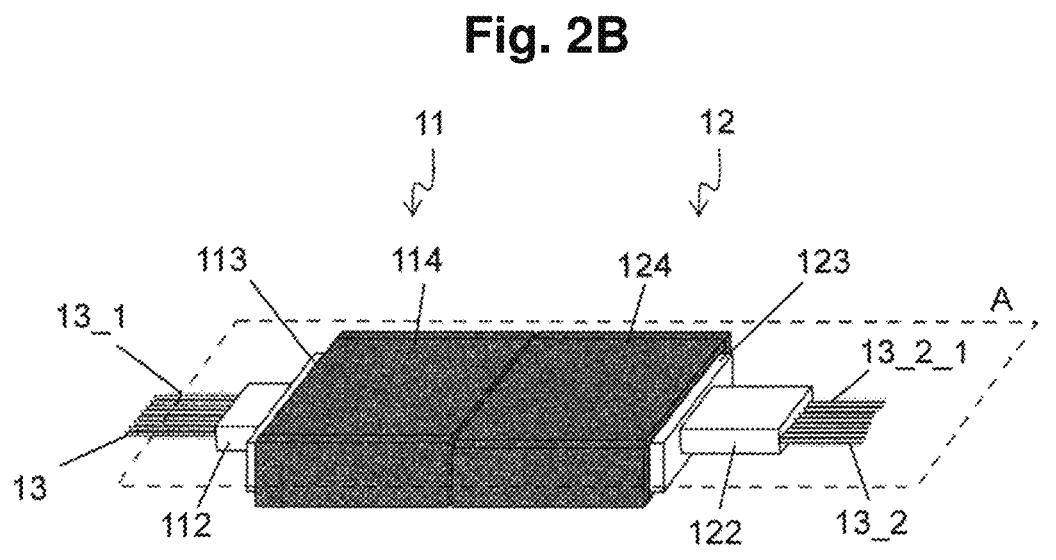

FIGS. 2A and 2B illustrate perspective views of peripheries of the optical connectors of the mounting structure 10 before connection and after connection, respectively. In addition, FIGS. 3A and 3B respectively illustrate schematic top views of the mounting structure 10 before and after connection with a plane A in FIG. 2B as a cross section.

In the mounting structure 10, the first optical connector 11 includes a ferrule 113 in which a plurality of optical fibers (first optical fibers) 13 is accommodated with a boot 112 interposed therebetween, the first magnetic component 114, and guide pins 115 as a positioning structure on an end surface 113_1 of the ferrule.

In addition, the second optical connector 12 includes a ferrule 123 in which a plurality of optical fibers (second optical fibers) 13_2 is accommodated with a boot 122 interposed therebetween, the second magnetic component 124, and guide holes 125 into which the guide pins 115 are inserted (fitted) as a positioning structure on an end surface of the ferrule facing the first optical connector 11.

Here, the ferrule 113 is, for example, the MT ferrule.

Further, each of the magnetic components is constituted of the hard magnetic material (what is called a permanent magnet). As the material of the permanent magnet, any known magnet may be used according to the magnetic force to be exerted. As a representative magnet, a neodymium magnet can be used. In addition, any known magnet such as a ferrite magnet, an alnico magnet, a samarium cobalt magnet, KS steel, MK steel, or a neodymium iron boron magnet can be used. In addition, any magnet whose magnetic characteristics are adjusted by slightly changing the composition thereof can of course be used similarly. It is sufficient if these are appropriately selected in consideration of a necessary magnetic force, thermal demagnetization at a use temperature, and the like.

In addition, the first and second magnetic components 114 and 124 are arranged so as to surround the peripheries of the ferrules 113 and 123 in the first and second optical connectors 11 and 12, respectively, and are integrated with the ferrules, respectively.

In addition, although the example in which the guide pins are provided on the end surface of the ferrule 113 of the first optical connector 11 and the guide holes are provided on the end surface of the ferrule 123 of the second optical connector 12 has been described, the guide holes may be provided on the end surface of the ferrule 113 of the first optical connector 11 and the guide pins may be provided on the end surface of the ferrule 123 of the second optical connector 12.

The ferrule 113 of the first optical connector 11 and the ferrule 123 of the second optical connector 12 are positioned by the guide pins.

Here, the optical fibers are, for example, a silica-based single mode fiber having a clad diameter of 125 μm and a core diameter of about 10 μm.

The ferrules 113 and 123 and the first and second magnetic components 114 and 124 are integrated via an adhesive. Note that, in addition to the bonding, the integration may be performed by mechanical fitting or metal bonding (solder or the like), or another mechanical component for integration may be interposed, and the integration may be performed by any known method as long as the magnetic force between the magnetic components is transmitted to the ferrules.

Here, in the magnetic components constituted of magnets, an N-pole and an S-pole are arranged so that a magnetic attracting force acts between the facing magnetic components. For example, in a case of using a magnet in which the N pole and the S pole are magnetized along the longitudinal direction of the optical fibers, when the N pole side is arranged on the connection end surface side of the first magnetic component 114, the S pole side is arranged on the connection end surface side of the second magnetic component 124, so that the magnetic attracting force acts by N-S. By this magnetic force, an attractive force also acts between the ferrules integrated with the magnetic components.

In addition, the optical fibers are polished so as to slightly protrude from the ferrule with respect to the longitudinal direction of the optical fibers at the connection end surface.

In addition, the connection end surface of the magnetic component and the connection end surface of the ferrule are positioned so that the same surface or the connection end surface of the magnetic component is drawn from the ferrule connection end surface in the longitudinal direction of the optical fibers. With this positional relationship, a gap between permanent magnets, which are magnetic components, is reduced as much as possible without hindering the contact of the facing optical fiber end surfaces, and a large magnetic force is exerted.

Effects of such a structure will be described below. In a mounting form of optical modules such as a conventional CPO, a plurality of optical fibers optically connected to a plurality of optical modules on a substrate is drawn out, and light is input to and output from external optical fibers by being connected to the other optical connector via an optical connector provided at one end of the optical fibers.

Here, when the optical connectors are connected, it is necessary to maintain the connection state while applying a constant pressing force to the connection end surfaces, but in the connection structure of the conventional optical connector, it is necessary to use an optical connector using a leaf spring component such as a clip or a claw or a spring component such as a coil spring in order to apply the pressing force. In addition, it is necessary to use a mechanical fastening structure in order to maintain the connection state.

However, in the conventional connection structure, sizes of spring components such as a leaf spring and a coil spring and additional housing components for holding the spring components limit miniaturization of the connector connection structure.

Further, it is necessary to deform the spring component in order to perform insertion and removal using the leaf spring component or the like, and thus a space for performing actual connection work and an extra space for inserting a connection jig or the like are required. This work space leads to the necessity of a certain gap or more between the plurality of optical connectors when connecting a large number of the plurality of optical connectors, which is a limiting factor in arranging the plurality of optical connectors at high density. Consequently, there has been a problem that mounting of optical modules on the substrate at high density is restricted.

With the structure of embodiments of the present invention, a pressing force can be applied between the connection end surfaces by a magnetic attracting force without using the mechanical spring component as described above, and the connection state can be maintained by the magnetic attracting force without using a leaf spring component or a housing component.

Thus, the number of members required for connection of the optical connectors can be reduced, and space saving of the connection portion can be achieved. Furthermore, complicated work at the time of insertion and removal, which has been required for the leaf spring component or the like, can be eliminated, and the mounting space required for attachment and detachment work can also be minimized. Consequently, it is possible to achieve the connection structure of the optical connectors which are significantly higher in density than the conventional case, and it is possible to mount the plurality of optical modules mounted on the board at high density.

Note that, as for connection between the optical fibers in the optical connector, as in the present embodiment, protrusion of the optical fiber end surface from the ferrule end surface is appropriately set, and a pressing force by the magnet is applied, so that physical contact (PC) connection can be achieved in all the optical fibers.

Naturally, the connection form between the optical connectors is not limited thereto. For example, the gap between the optical fibers to be connected may be filled with a resin (refractive index matching material) or the like having an appropriate refractive index to suppress Fresnel reflection. In addition, by obliquely polishing the optical fiber end surface, a connection form in which return light accompanying Fresnel reflection is suppressed may be employed. Further, a microlens structure, a microlens component, or the like may be provided near the optical fiber end surface while a gap is provided between the connection end surfaces, and a spatial coupling system may be constructed and connected. In a case of the spatial coupling system, for example, the connection end surface of the magnetic component may be arranged to protrude from the connection end surface of the ferrule. In addition, antireflection coating or the like may be appropriately applied to the optical fiber connection end surface. Alternatively, a configuration may be employed such that return light is prevented as an oblique end surface while a constant air gap is provided more easily.

Next, a tolerance of the magnetic components will be described. The surfaces of the facing magnetic components are preferably parallel to each other in order to stabilize the vector of the magnetic attracting force in the longitudinal direction of the optical fibers. However, even if the parallelism is not perfect, if the butt angle in the longitudinal direction between the ferrules is not greatly deviated, a reduction in an optical coupling loss can be ignored. That is, good optical characteristics can be achieved even with parallelism that can be secured with practical machining accuracy.

Note that, without having both of the pair of facing ferrules of the above-described hard magnetic material (permanent magnet), if only one of them is the permanent magnet and the other magnetic component is the soft magnetic material, a magnetic force acts between the magnetic components, and thus a similar application is possible.

Modification of First Embodiment

Figure 4A:
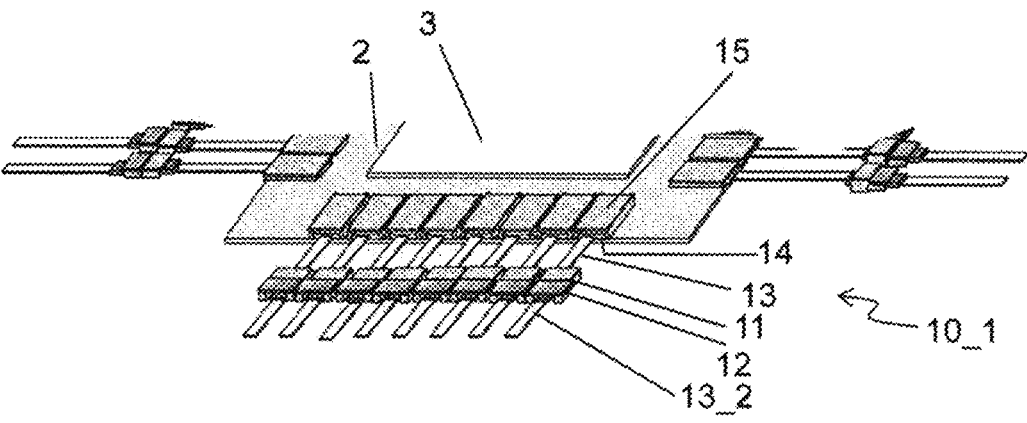
FIG. 4A is a perspective schematic view illustrating a mounting structure (after connection) of an optical module according to a modification of the first embodiment of the present invention.
Figure 4B:
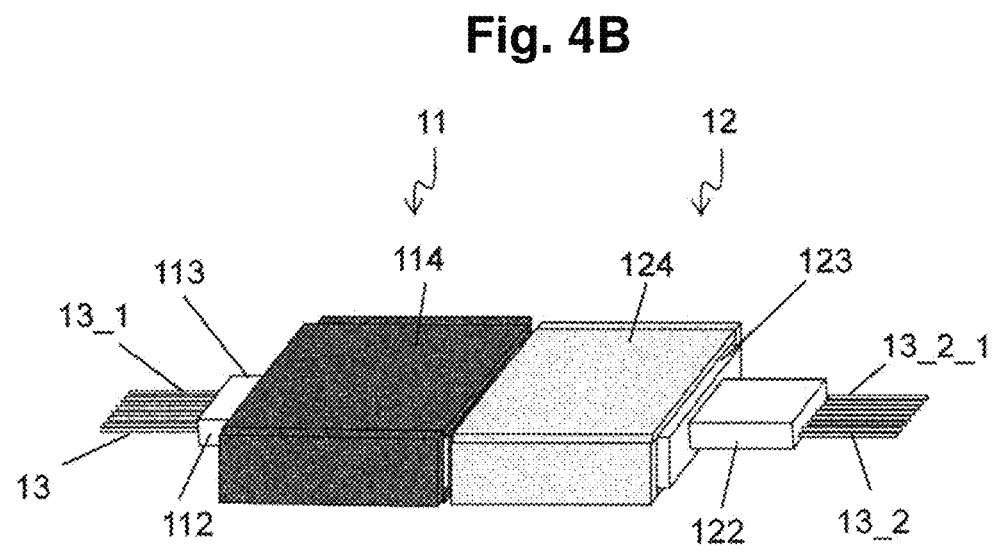

In a mounting structure 10_1 according to a modification of the first embodiment, as illustrated in FIGS. 4A and 4B, the first magnetic components 114 on the first optical connector 11 side connected to the optical module 14 side are a magnetic metal which is the soft magnetic material.

In the mounting structure 10_1, the optical module 14 is provided with a metal lid 15. The lid may be arranged so as to surround the periphery of the optical module, or may be provided only on the upper portion.

Here, as the soft magnetic material, a metal attracted to what is called a magnet is known, and for example, iron, nickel, cobalt, or a material having magnetism of stainless steel (SUS) which is an iron-based alloy (for example, SUS 430), or the like can be used.

Naturally, the magnetic force to be exerted is larger and the attractive force is larger when both the facing magnetic components are magnets. On the other hand, although the attractive force is inferior to the above, the other may be the soft magnetic material from the viewpoint of workability, prevention of adhesion with other components, prevention of influence by magnetic force, and the like, and these can be appropriately selected according to a necessary attractive force, sizes of the magnetic components, required conditions, and the like.

In addition, in the structure illustrated in FIGS. 2A to 4B, the magnetic component (the first magnetic component 114 or the second magnetic component 124) are arranged so as to surround the periphery of the ferrule (the ferrule 113 or the ferrule 123), but naturally, embodiments of the present invention are not limited thereto as long as the structure can exert a magnetic force. FIGS. 5A to 5K illustrate arrangement variations of the positional relationship between the magnetic component (the first magnetic component 114 or the second magnetic component 124) and the ferrule (the ferrule 113 or the ferrule 123) as viewed from the connection end surface side of the optical connector.

Figure 5A:
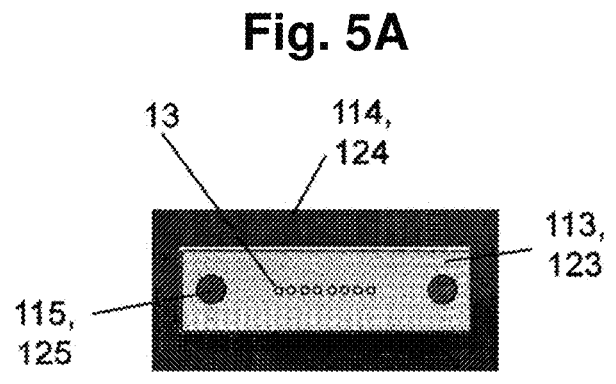
Figure 5B:
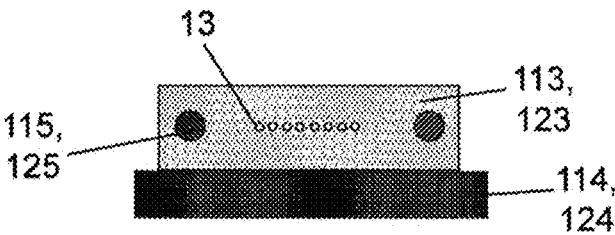
FIG. 5B is a front cross-sectional view illustrating an example of the optical connector in the mounting structure of the optical module according to the first embodiment of the present invention.
Figure 5C:
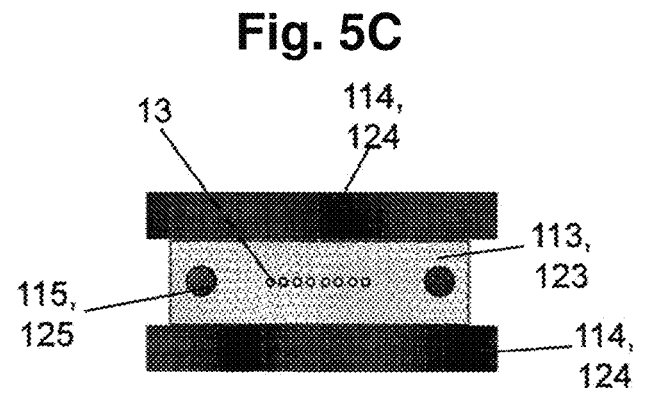
Figure 5D:
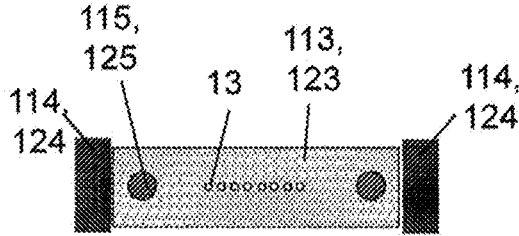
FIG. 5D is a front cross-sectional view illustrating an example of the optical connector in the mounting structure of the optical module according to the first embodiment of the present invention.

As illustrated in FIG. 5A, in addition to the structure in which the outer periphery is surrounded by the magnetic component as in FIG. 1, a configuration in which only one surface of the outer periphery is the magnetic component may be employed as a matter of course in FIG. 5B. In addition, as illustrated in FIGS. 5C and 5D, a form of arrangement on the upper and lower surfaces or the left and right surfaces may be employed.

Figure 5E:
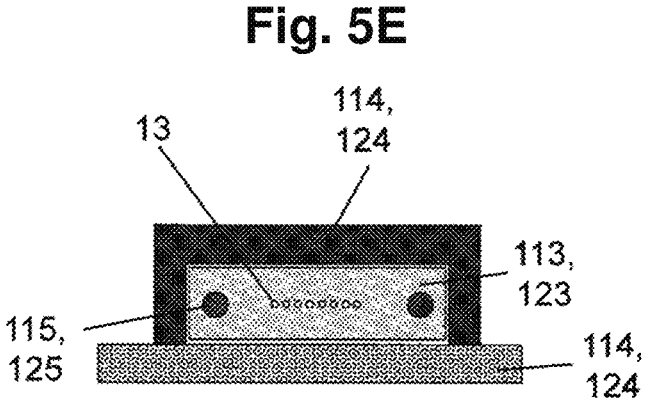
FIG. 5E is a front cross-sectional view illustrating an example of the optical connector in the mounting structure of the optical module according to the first embodiment of the present invention.

In addition, the magnetic component may not be a single material, and may be a combination of the hard magnetic material and the soft magnetic material. For example, as illustrated in FIG. 5E, a part of the outer periphery may be made of the hard magnetic material (magnet), and a part of the outer periphery may be made of the soft magnetic material.

Figure 5F:
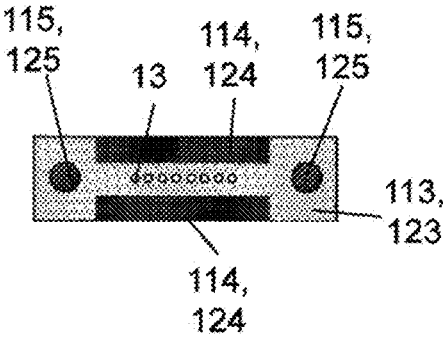
FIG. 5F is a front cross-sectional view illustrating an example of the optical connector in the mounting structure of the optical module according to the first embodiment of the present invention.
Figure 5G:
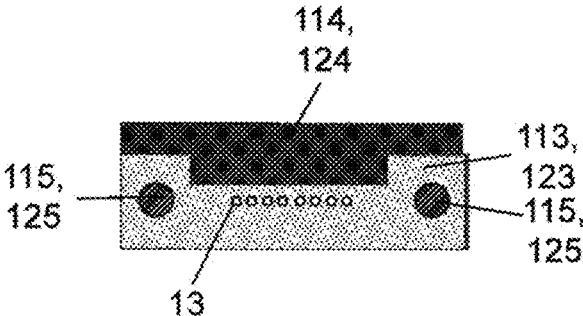
FIG. 5G is a front cross-sectional view illustrating an example of the optical connector in the mounting structure of the optical module according to the first embodiment of the present invention.

In addition, as illustrated in FIGS. 5F and 5G, by incorporating or penetrating the magnetic component into the ferrule, further miniaturization and mountability can be enhanced. These may be mechanically bonded, may be integrated by magnetic force, or may be bonded by any joining means such as bonding or soldering.

Figure 5H:
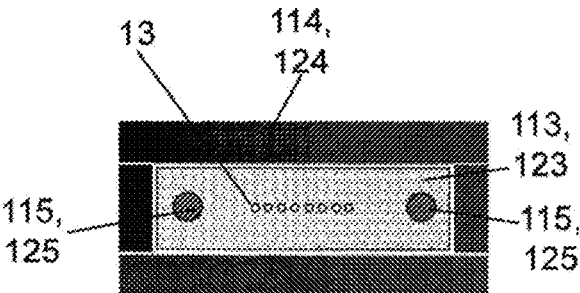
FIG. 5H is a front cross-sectional view illustrating an example of the optical connector in the mounting structure of the optical module according to the first embodiment of the present invention.
Figure 5I:
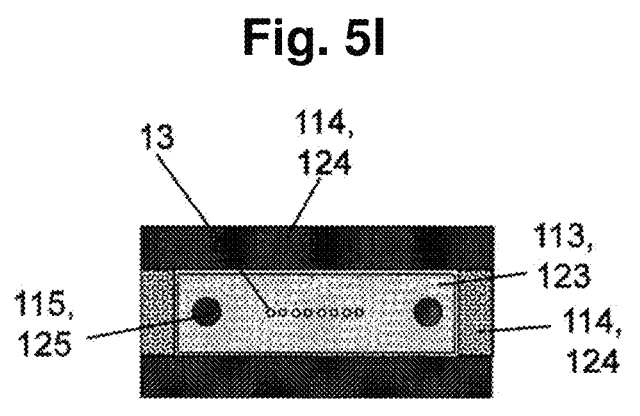
Figure 5J:
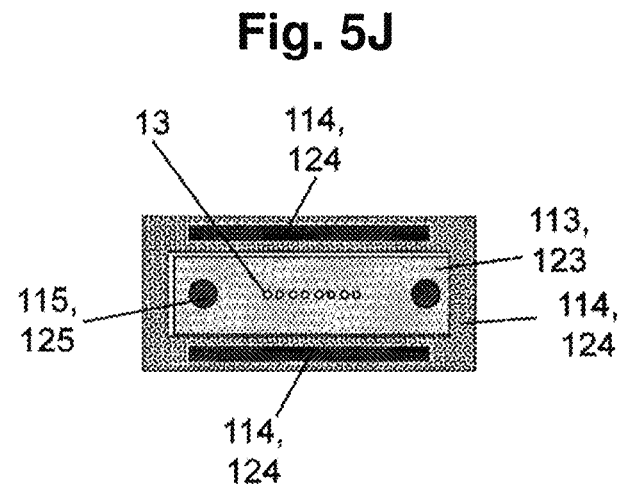
Figure 5K:
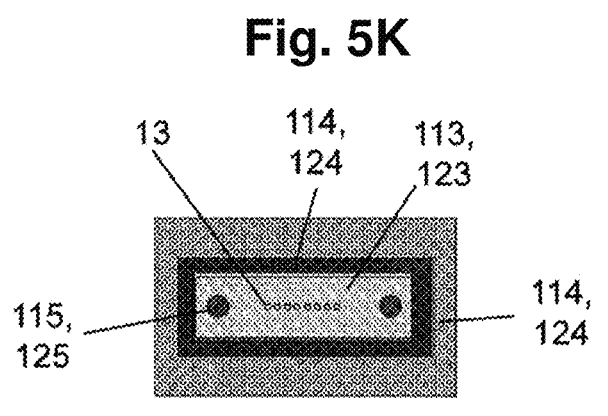

Similarly, as illustrated in FIGS. 5H to 5J, a combination of a plurality of magnetic components may be used. In addition, a configuration may be employed in which a magnetic metal component such as metal foil like SUS 430 may be attached to any end surface in FIGS. 5H-5J. Further, plating treatment may be performed as necessary in order to prevent rust of a magnet or metal. By using the soft magnetic material such as nickel as the plating material, reduction in magnetic force by the plating thickness can be minimized.

As will be described later in another embodiment, a structure (FIG. 5K) in which a plate of a magnetic component constituted of the soft magnetic material is further provided around the magnetic component may be employed.

Figure 6:
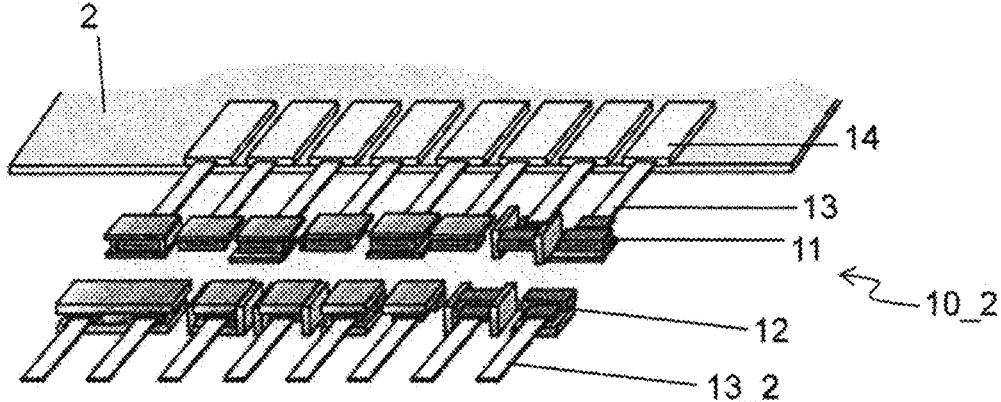
FIG. 6 is a perspective schematic view illustrating an example of the mounting structure (before connection) of the optical module according to the first embodiment of the present invention.

Naturally, embodiments of the present invention are not limited to FIGS. 5A to 5K, and any analogy may be used. In addition, any combination of FIGS. 5A to 5K may be used as a pair to be connected. FIG. 6 is a perspective view of a mounting structure 10_2 of an optical module illustrating an example with a plurality of combinations having different cross-sectional structures.

In addition, FIGS. 7A to 7F illustrate arrangement variations of the positional relationship between the magnetic component (the first magnetic component 114 or the second magnetic component 124) and the ferrule (the ferrule 113 or the ferrule 123) in a side cross-sectional view when viewed in the longitudinal direction of the optical fibers.

Figure 7A:
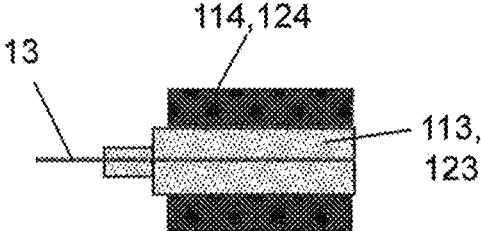
FIG. 7A is a side sectional view illustrating an example of the optical connector in the mounting structure of the optical module according to the first embodiment of the present invention.
Figure 7B:
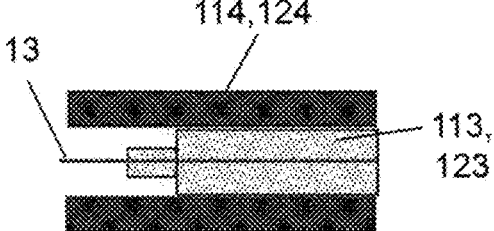
FIG. 7B is a side sectional view illustrating an example of the optical connector in the mounting structure of the optical module according to the first embodiment of the present invention.
Figure 7C:
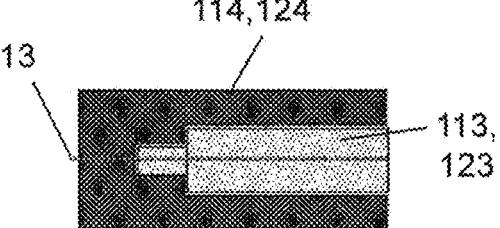
FIG. 7C is a side sectional view illustrating an example of the optical connector in the mounting structure of the optical module according to the first embodiment of the present invention.

As illustrated in FIG. 7A, the magnetic component may be shorter than the ferrule, or as illustrated in FIG. 7B, of course, may be longer. In this case, for example, the tape fiber portion is naturally smaller in the thickness direction than the ferrule, and thus the thickness of the magnetic component may be changed along the tape fiber as illustrated in FIG. 7C.

Figure 7D:
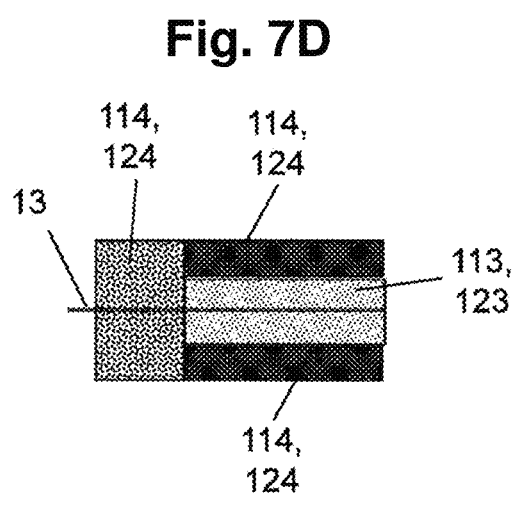
Figure 7E:
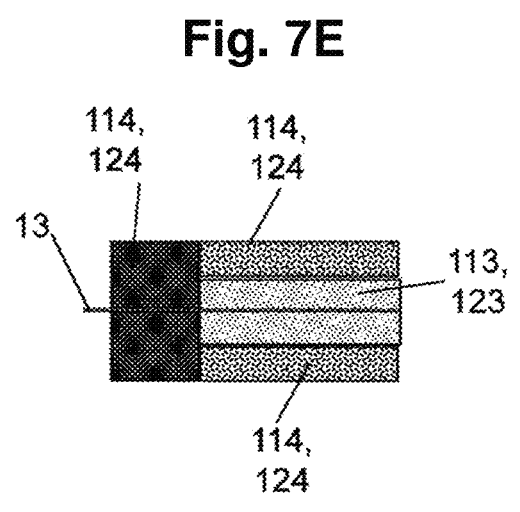

Also in the longitudinal direction of the optical fibers, the magnetic component may not be a single material, and may be the combination of the hard magnetic material and the soft magnetic material. As illustrated in FIGS. 7D and 7E, a part may be made of the hard magnetic material and a part may be made of a metal which is the soft magnetic material in a configuration similar to that in FIG. 7C. With this configuration, it is possible to enhance the magnetic force while suppressing the use amount of the magnet, and it is also possible to simultaneously perform a boot function or the like for protecting the optical fibers or the like.

Figure 7F:
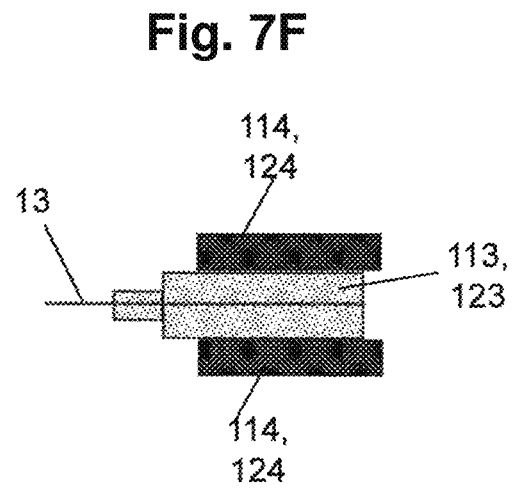

As illustrated in FIG. 7F, the magnetic component may protrude from the connection end surface more than the ferrule.

In any of FIGS. 5A to 5K and FIGS. 7A to 7F, in a case where a plurality of magnetic components is combined, the magnetic components may be mechanically bonded, may be integrated by magnetic force, or may be bonded by any bonding means such as adhesion or solder. Similarly to the above, as the combination of the magnetic components, any combination as illustrated in FIGS. 5A to 5K and FIGS. 7A to 7F may be used, and any combination may be used for a pair facing each other as the connection structure. Of course, any combination that can be analogized other than those illustrated in FIGS. 5A to 5K and FIGS. 7A to 7F may be used. For example, a magnetic component in which a magnetic metal, a permanent magnet, and a magnetic metal are combined in the longitudinal direction, or the like may be used.

Further, as described above, in a case where one is a magnetic component including a magnet, the other may be made of only the soft magnetic material. If one of them is constituted of only the soft magnetic material, the magnetic force is slightly reduced as compared with a case where both are constituted of a magnet, but it is not necessary to worry about the combination and arrangement of N-S that exerts the magnetic attracting force. Therefore, this configuration may be preferable in practice, and is only required to be appropriately selected.

By using the variation as described above, in addition to an increase in magnetic force for further miniaturization, an effect of further space saving by sharing components can be exhibited as described later in addition to improvement in workability in manufacturing.

Figure 8A:
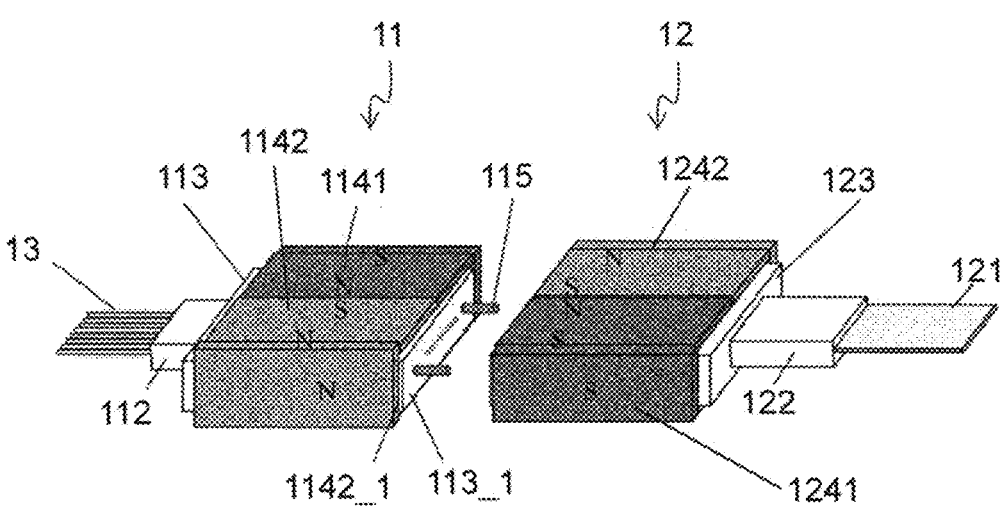
FIG. 8A is a perspective schematic view illustrating an example of the optical connectors in the mounting structure of the optical module according to the first embodiment of the present invention.

Further, in a case where a permanent magnet is used for the magnetic component, a single magnet may not necessarily be used. As illustrated in FIG. 8A, a configuration in which a plurality of permanent magnets 1141 and 1142 in the first magnetic component 114 and a plurality of permanent magnets 1241 and 1242 in the second magnetic component 124 are combined and connected may be employed, or a multipolar magnet divided one-dimensionally in the longitudinal direction of the optical fibers or in a direction orthogonal to the longitudinal direction may be employed.

Figure 8B:
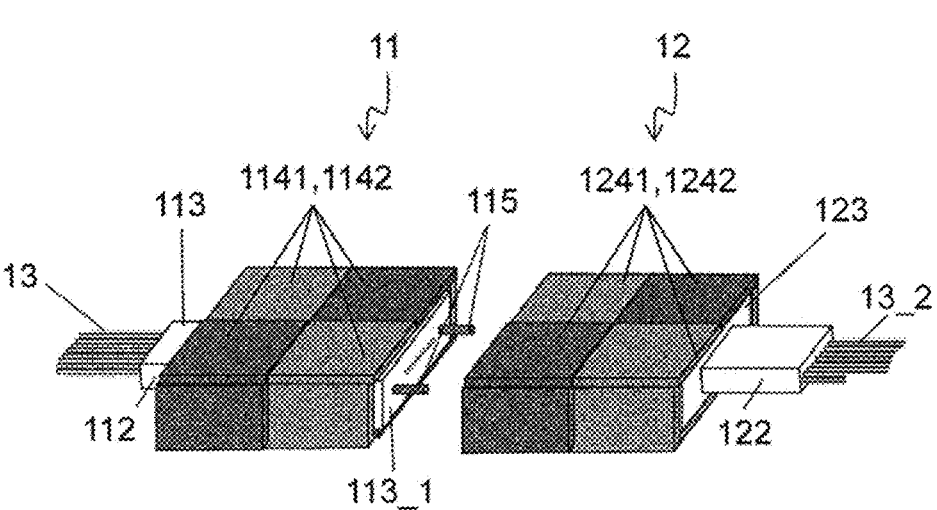
FIG. 8B is a perspective schematic view illustrating an example of the optical connectors in the mounting structure of the optical module according to the first embodiment of the present invention.

In addition, as illustrated in FIG. 8B, a two-dimensional multipolar magnet array in which the plurality of permanent magnets 1141 and 1142 in the first magnetic component 114 and the plurality of permanent magnets 1241 and 1242 in the second magnetic component 124 are combined may be employed. The multipolar magnet can include connecting magnet components having a pair of N-S magnetized in advance using a magnetic attracting force, and the gap can be filled with an adhesive, solder, or the like as necessary to form an integrated component.

In addition, another soft magnetic material such as a metal plate that functions as what is called a yoke and exerts a larger magnetic force may be added. The magnetic force per unit volume can be increased by having multipolarity and adding the yoke, and space saving can be further achieved.

Figure 9:
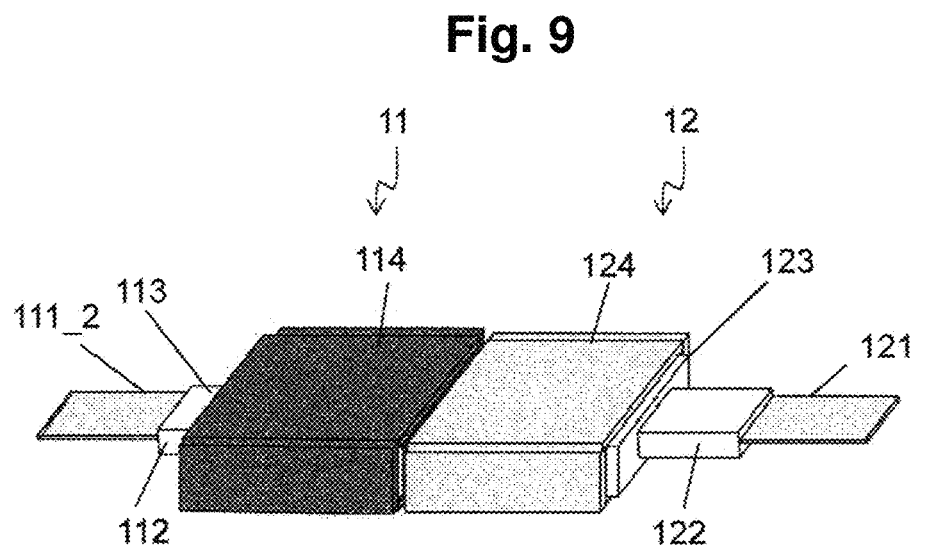

In the mounting structure according to the present embodiment and the modification, an example in which the plurality of optical fibers (first optical fibers) 13 is accommodated in the first optical connector 11 has been described, but as illustrated in FIG. 9, polymer waveguides 111_2 and 121 may be used instead of the plurality of optical fibers. As described above, by using the polymer waveguide instead of the plurality of optical fibers to have a structure similar to that of the PMT connector, embodiments of the present invention can also be applied to connection between the polymer waveguides or connection between the polymer waveguide and the optical fibers.

Second Embodiment

A mounting structure of an optical module according to a second embodiment of the present invention will be described with reference to FIGS. 10A to 10B.

Configuration of Mounting Structure of Optical Modules

Figure 10A:
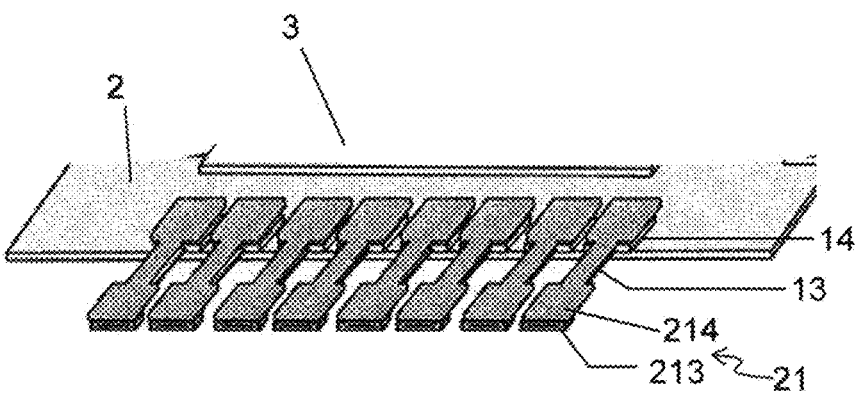
FIG. 10A is a perspective schematic view illustrating a mounting structure (before connection) of an optical module according to a second embodiment of the present invention.
Figure 10B:
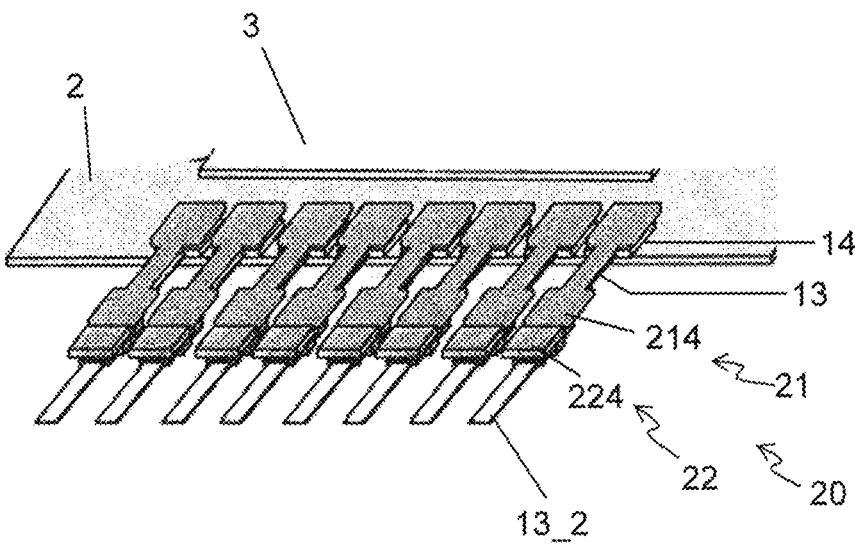
FIG. 10B is a perspective schematic view illustrating the mounting structure (after connection) of the optical module according to the second embodiment of the present invention.

FIGS. 10A and 10B are perspective views of a mounting structure 20 of an optical module according to a second embodiment of the present invention before and after connection, respectively. The basic configuration is the same as that of the first embodiment, and in a first optical connector 21, an MT ferrule is used as a ferrule 213 as described above, and guide pins are used as a positioning structure.

In the first optical connector 21, a first magnetic component 214 is arranged on and integrated with an upper surface of the ferrule 213. As illustrated in FIG. 10A, an upper surface portion of the first magnetic component 214 extends to the optical modules 14 and is integrated with the lid arranged around the optical modules 14. At this time, the first magnetic component 214 on the first optical connector 21 side is constituted of an iron-based material of magnetic metal which is the soft magnetic material.

As a detailed configuration, the first optical fibers 13 are arranged below the first magnetic component 214 extending from the first optical connector 21, and the optical module 14 is arranged below the first magnetic component 214 around the substrate 2.

In the present embodiment, an example of having a narrow width above the first optical fibers 13 has been described as an upper surface shape of the first magnetic component 214, but the upper surface shape is not limited thereto, and may be a rectangle having a constant width.

In the present embodiment, an example in which the first magnetic component 214 is arranged only on the upper surface of the ferrule 213 has been described, but the first magnetic component 214 may be arranged on a side surface or a bottom surface of the ferrule 213. For example, the first magnetic component 214 is only required to be arranged in the form illustrated in FIGS. 5A to 5K.

On the other hand, in a second optical connector 22, a second magnetic component 224 is arranged on an upper surface of a ferrule 223. Here, the second magnetic component 224 is constituted of the neodymium magnet which is the hard magnetic material. Consequently, the facing end surfaces of the first magnetic component 214 and the second magnetic component 224 are connected by magnetic force, thereby connecting the first optical connector 21 and the second optical connector 22.

In the present embodiment, an example in which the second magnetic component 224 is arranged only on the upper surface of the ferrule 223 has been described, but the second magnetic component 224 may be arranged on a side surface or a bottom surface of the ferrule 223. For example, the second magnetic component 224 is only required to be arranged in the form illustrated in FIGS. 5A to 5K, and is only required to have a configuration in which a magnetic force acts between the first magnetic component 214 and the second magnetic component.

As described above, the magnetic metal as the first magnetic component 214 is integrated with the lid arranged around the optical module 14. That is, the lid is also constituted of a magnetic metal. The lid plays a role of protecting the electrical elements and the optical transceiver in the optical module 14, and is thermally connected to the electrical elements and the optical transceiver or a package portion on which the electrical elements and the optical transceiver are mounted with a heat transfer portion interposed therebetween, and has a function of transferring or dissipating heat generated by each of the elements constituting the optical module 14 to the outside.

With such a configuration, similar effects to those of the first embodiment can be exerted. That is, it is possible to apply a pressing force between the optical connectors by a magnetic attracting force without using a mechanical spring component in connection of the optical connectors, and it is possible to maintain a connection state without using a leaf spring component, a housing component, or the like by the magnetic attracting force.

Thus, the number of members required for connection of the optical connectors can be reduced, and space saving of the connection portion can be achieved. Furthermore, complicated work at the time of insertion and removal, which has been required for the leaf spring component or the like, can be eliminated, and the mounting space required for attachment and detachment work can also be minimized.

Consequently, it is possible to achieve the connection structure of the optical connectors which are significantly higher in density than the conventional case, and it is possible to mount the plurality of optical modules mounted on the board at high density.

Furthermore, in addition to the above effect, according to the present embodiment, by sharing the first magnetic component 214 with the lid of the optical module 14, the total number of components can be reduced, and space saving of the optical module can be further achieved.

In addition, heat generation from the optical module 14 is performed through heat dissipation from the lid, but with the present configuration, the surface area of the lid can be increased to the optical fiber drawing side. At this time, the lid preferably has a high thermal conductivity, and an iron-based lid is more preferable than an SUS-based lid. In addition, the thermal conductivity can be increased by increasing the lid thickness or reducing the heat transfer coefficient of the surface. In addition, although not illustrated, a member having a high thermal conductivity may be separately attached on the lid to efficiently transfer heat to the optical connector side. For example, a graphite sheet, a heat pipe, or the like may be further integrated on the lid. The same applies to the following embodiments.

In a conventional configuration, since an integrated circuit and other optical modules are densely arranged around one optical module, in order to increase the surface area of the lid, it is necessary to provide a fin, increase the thickness, or take an extra area of the substrate.

With the present configuration, the lid can be extended to the optical fiber drawing side to increase the surface area, and an extra space for heat dissipation of the lid is not taken, so that a further space-saving optical module mounting form can be achieved.

Furthermore, by employing the same structure, since the first optical connector 21 is connected to the first magnetic component 214, it is possible to prevent the optical fibers 13 and the first optical connector 21 drawn out from the optical module 14 from sagging due to gravity and support the optical fibers, and prevent an excessive stress from being applied to the optical fibers 13.

Consequently, an effect of physically protecting the short optical fibers connected to the optical module can also be secondarily exhibited.

Note that, when heat is applied to the lid, the heat is also transferred to the first magnetic component 214 (integrated with the lid) near the first optical connector 21, but since the positioning of the optical fibers is performed by positioning of the MT ferrule and the guide pins, the optical characteristics can be maintained without affecting an optical axis misalignment between the optical fibers.

Further, in the present embodiment, the lid and the first magnetic component 214 are described as an integrated component by way of example, but a similar effect can be exerted even if the lid and the first magnetic component are configured to be connected by any method such as adhesion, solder, or mechanical fastening after being mounted as separate components.

In the present embodiment, an example has been described in which the first magnetic component 214 and the second magnetic component 224 are arranged only on the upper surfaces of the ferrules 213 and 223, respectively, but as a matter of course, the first magnetic component 214 and the second magnetic component 224 can be applied to either a configuration that covers the periphery or a configuration that covers three sides.

Third Embodiment

A mounting structure of an optical module according to a third embodiment of the present invention will be described with reference to FIGS. 11A and 11B.

Configuration of Mounting Structure of Optical Modules

Figure 11A:
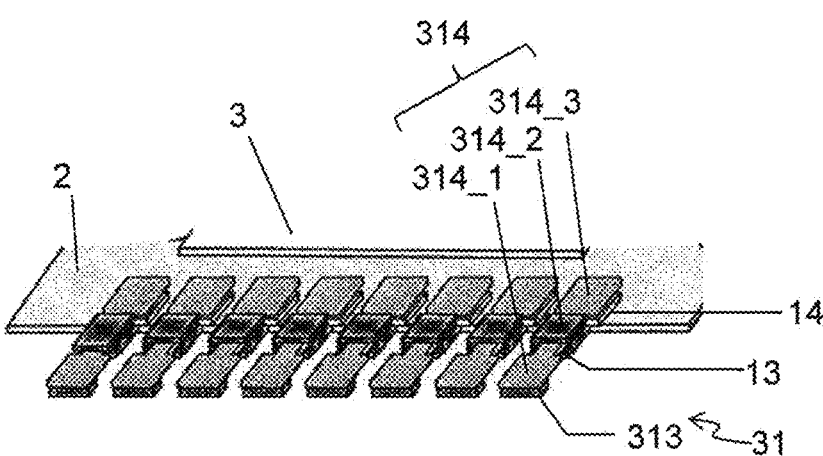
FIG. 11A is a perspective schematic view illustrating the mounting structure (before connection) of the optical module according to a third embodiment of the present invention.
Figure 11B:
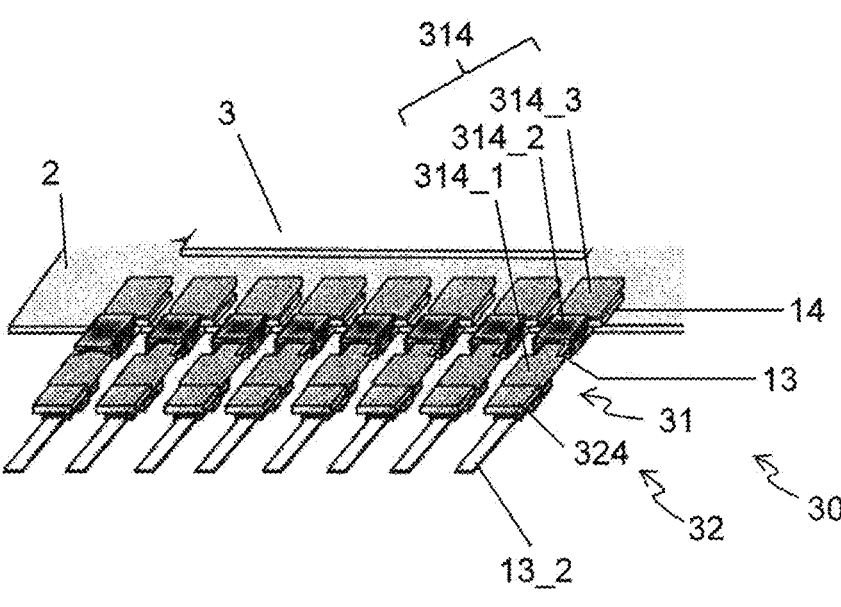
FIG. 11B is a perspective schematic view illustrating the mounting structure (after connection) of the optical module according to the third embodiment of the present invention.

FIGS. 11A and 11B are perspective views of a mounting structure 30 of an optical module according to the third embodiment of the present invention before and after connection, respectively. The basic configuration is the same as that of the second embodiment, and a first magnetic component 314 is integrated with a first optical connector 31 around the first optical connector 31 connected to the optical module 14 with the short fiber 13 interposed therebetween. An upper surface portion of the first magnetic component 314 extends to the optical module 14 and is integrated with the lid arranged around the optical module 14.

In the mounting structure 30 according to the present embodiment, as illustrated in FIG. 11A, a first magnetic component 314_3 on the optical module 14 side is constituted of magnetic metal nickel. On the other hand, the first magnetic component 314 on the first optical connector 31 side is constituted of a composite of nickel 314_1 of the magnetic metal which is the soft magnetic material and a samarium cobalt magnet 314_2 which is the hard magnetic material, and the samarium cobalt magnet 314_2 having small thermal demagnetization is connected to nickel 314_3 on the optical module 14 side.

On the other hand, a second magnetic component 324 integrated with a second optical connector 32 connected to the first optical connector 31 is constituted of the neodymium magnet, which is the hard magnetic material.

In this configuration, facing end surfaces of the first magnetic component 314 and the second magnetic component 324 are connected by magnetic force, thereby connecting the first optical connector 31 and the second optical connector 32.

At this time, the magnetic metal contained in the first magnetic component 314 is integrated with the metal lid arranged around the optical module 14.

As described above, the first magnetic component 314 is the composite, but the vicinity of the connection end surface of the first optical connector 31 is constituted of the magnetic metal, and the magnet is arranged at a position away from the connection end surface toward the optical module 14 side along the longitudinal direction of the optical fibers. The magnetic metal 314_1 and the magnet 314_2 in the first magnetic component 314 are connected by magnetic force.

In addition, an N-pole and an S-pole of the magnet 314_2 included in the first magnetic component 314 are magnetized in the longitudinal direction of the optical fibers, and the second magnetic component 324 including the magnet is similarly magnetized in the longitudinal direction of the optical fibers, and is arranged in a direction opposite to the pole of the magnet 314_2.

Consequently, along the longitudinal direction of the optical fibers, a magnetic circuit is formed through a magnetic metal portion in which a magnet portion of the first magnetic component 314 and a magnet portion of the second magnetic component 324 are included in the first magnetic component 314 and integrated with the metal lid, and a magnetic attracting force is exerted between the connection end surfaces.

With such a structure, like the effects described in the first and second embodiments, the number of members required for connection of the optical connectors can be reduced without using a mechanical pressing component, a leaf spring component for maintaining the connection state, or a housing component, and space saving of the connection portion can be achieved.

Furthermore, complicated work at the time of insertion and removal, which has been required for the leaf spring component or the like, can be eliminated, and the mounting space required for attachment and detachment work can also be minimized.

In addition, as in the second embodiment, heat generation from the optical module 14 is performed through heat dissipation from the lid, but with the present configuration, by increasing the surface area of the lid toward the optical fiber drawing side, an extra space for heat dissipation of the lid is not taken, and a further space-saving optical module mounting form can be achieved.

Furthermore, by employing the same structure, since the first optical connector 31 is connected to the first magnetic component 314, it is possible to prevent the optical fibers 13 and the first optical connector 31 drawn out from the optical module 14 from sagging due to gravity and support the optical fibers, and prevent an excessive stress from being applied to the optical fibers 13.

Consequently, the effect of physically protecting the short optical fibers connected to the optical module can also be secondarily exhibited.

In addition to these, in the third embodiment, since the first magnetic component 314 also includes a magnet, the magnetic force acting per unit volume can be greatly exerted as compared with the second embodiment.

Thus, the size of the magnetic component for exerting the necessary pressing force can be further miniaturized, and further space saving can be achieved.

Further, in this case, since the outer peripheral size of the short optical fiber portion is larger than the outer peripheral size around the optical connector, a magnet having a larger volume can be arranged along the short optical fiber, which is also suitable for increasing the magnetic force without increasing the space.

Note that, as a matter of course, any of the combinations described above may be used as long as the dimensions and arrangement of the magnet in the first magnetic component 314 and the positional relationship between the magnetic metal and the magnet are within the range of maintaining the above-described arrangement.

In the present embodiment, for example, in the first magnetic component 314, an example has been illustrated in which a component in which the magnetic metal is integrated near the lid and a connector connection portion is used, but a combination in which a plurality of magnetic metal components and magnets are arranged in the longitudinal direction of the optical fibers may be used.

For example, the lid of the magnetic metal provided around the optical module, the permanent magnet, and the magnetic metal near the connector connection portion may be arranged in this order along the longitudinal direction of the optical fibers, and connected by magnetic force or magnetic force and a joining material or the like.

In addition, the optical fibers have been described as an example of the connection target, but as a matter of course, embodiments of the present invention can also be applied to connection between optical waveguides or connection between an optical waveguide and an optical fiber.

Fourth Embodiment

A mounting structure of an optical module according to a fourth embodiment of the present invention will be described with reference to FIGS. 12A to 14B.

Configuration of Mounting Structure of Optical Modules

Figure 12A:
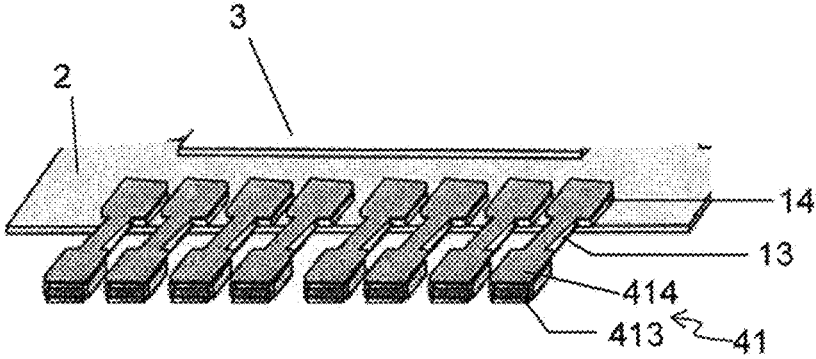
FIG. 12A is a perspective schematic view illustrating a mounting structure (before connection) of an optical module according to a fourth embodiment of the present invention.
Figure 12B:
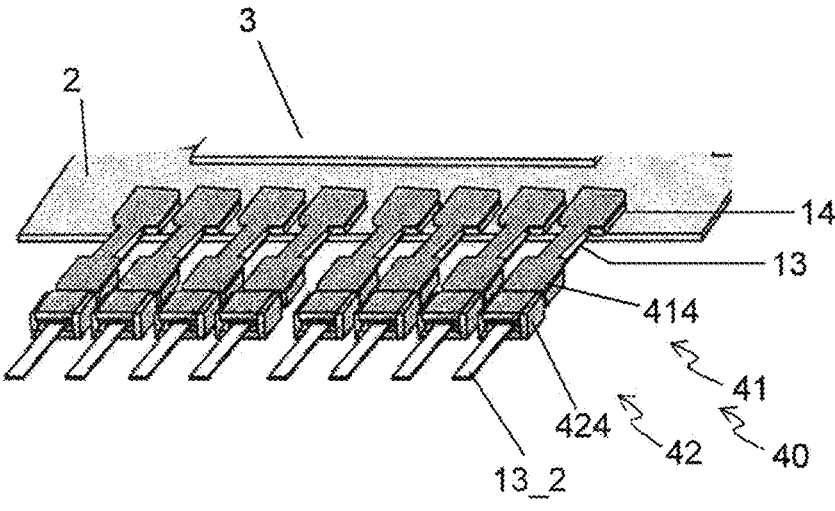
FIG. 12B is a perspective schematic view illustrating the mounting structure (after connection) of the optical module according to the fourth embodiment of the present invention.

FIGS. 12A and 12B are perspective views of a mounting structure 40 of an optical module according to the fourth embodiment of the present invention before and after connection, respectively. The basic configuration is the same as that of the second embodiment, and a first magnetic component 414 is integrated with a first optical connector 41 around the first optical connector 41 connected to the optical module 14 with the short fiber 13 interposed therebetween.

At this time, the first magnetic component 414 on the first optical connector 41 side is constituted of a composite of SUS 430 of magnetic metal, which is the soft magnetic material, and the neodymium magnet, which is the hard magnetic material. Here, in the first magnetic component 414, the upper surface is constituted of the magnetic metal, and both side surfaces and a bottom surface are constituted of the hard magnetic material. Alternatively, the first magnetic component 414 is only required to have the configuration illustrated in FIGS. 5A to 5K, for example, as long as the upper surface is constituted of the magnetic metal.

On the other hand, a second magnetic component 424 integrated with a second optical connector 42 connected to the first optical connector 41 is constituted of the neodymium magnet, which is the hard magnetic material. Alternatively, the second magnetic component 424 integrated with the second optical connector 42 connected to the first optical connector 41 may be constituted of a composite of the neodymium magnet, which is the hard magnetic material, and a magnetic metal component.

At this time, the magnetic metal contained in the first magnetic component 414 is integrated with the metal lid arranged around the optical module 14.

In addition, although the first magnetic component 414 is a composite, both a magnetic metal portion and a permanent magnet portion of the hard magnetic material are arranged near the connection end surface of the first optical connector 41. That is, a permanent magnet is arranged around a ferrule 413, and the magnetic metal integrated with the metal lid is provided on an upper portion of the permanent magnet. The permanent magnet included in the first magnetic component 414 and the ferrule 413 of the first optical connector 41 are integrated via an adhesive or the like, and the permanent magnet portion is connected to the magnetic metal provided on the upper portion thereof by magnetic force.

Like the first magnetic component 414, in the second magnetic component 424, the magnet and the magnetic metal are arranged such that a cross section of the connection end surface thereof is substantially the same as that of the first magnetic component 414.

With such a structure, like the effects described in the first to third embodiments, the number of members required for connection of the optical connectors can be reduced without using a mechanical pressing component, a leaf spring component for maintaining the connection state, or a housing component, and space saving of the connection portion can be achieved.

Furthermore, complicated work at the time of insertion and removal, which has been required for the leaf spring component or the like, can be eliminated, and the mounting space required for attachment and detachment work can also be minimized.

In addition, as in the second and third embodiments, the heat generation from the optical module 14 is performed through heat dissipation from the lid, but with the present configuration, by increasing the surface area of the lid toward the optical fiber drawing side, an extra space for heat dissipation of the lid is not taken, and a further space-saving optical module mounting form can be achieved.

Furthermore, by employing the same structure, since the first optical connector 41 is connected to the first magnetic component 414, it is possible to prevent the optical fibers 13 and the first optical connector 41 drawn out from the optical module 14 from sagging due to gravity and support the optical fibers, and prevent an excessive stress from being applied to the optical fibers 13.

Consequently, the effect of physically protecting the short optical fibers connected to the optical module can also be secondarily exhibited.

In addition, in the fourth embodiment, since the first magnetic component 414 also includes a magnet, and further, the connection end surface also includes a magnet, the magnetic force between magnetic structures acting per unit volume can be more greatly exerted as compared with the second embodiment.

Furthermore, in this case, since the magnetic metal is arranged in the periphery as compared with the connection between the magnets described in the first embodiment, leakage of the magnetic force to the space can be suppressed, and the magnetic force can be further increased.

Thus, the size of the magnetic component for exerting the necessary pressing force can be further miniaturized, and further space saving of mounting of the optical modules can be exhibited.

In addition, the first ferrule 413 constituting the first optical connector 41 is integrated with the surrounding magnets using a joining material, and is connected to the magnetic metal on an upper portion thereof only by magnetic force. Thus, when the connectors are connected to each other, the magnetic metal and the permanent magnet may be temporarily separated from each other in the lid and the first magnetic component 414 as necessary.

In the present embodiment, the example in which the magnet is arranged on the connection end surface of the optical connector in the configuration of the second embodiment has been described, but if the magnet is arranged on the connection end surface of the optical connector in the configuration of the third embodiment, the magnetic force can be further enhanced.

First Modification of Fourth Embodiment

Figure 13A:
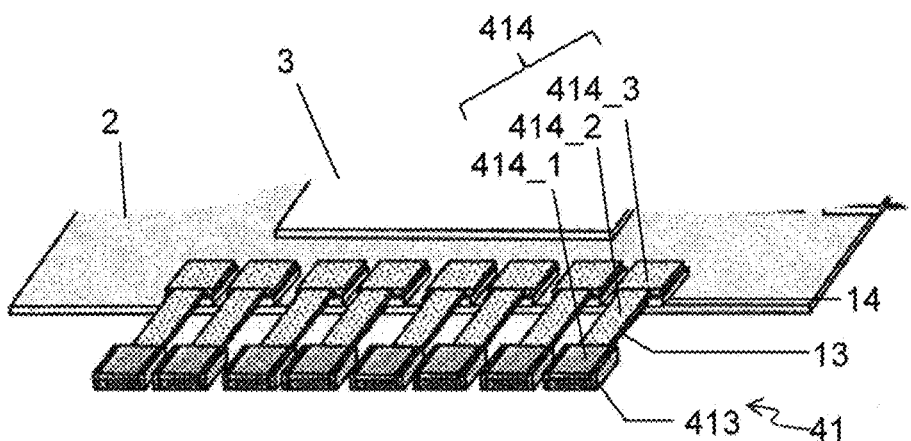
FIG. 13A is a perspective schematic view illustrating a mounting structure (before connection) of an optical module according to a modification of the fourth embodiment of the present invention.
Figure 13B:
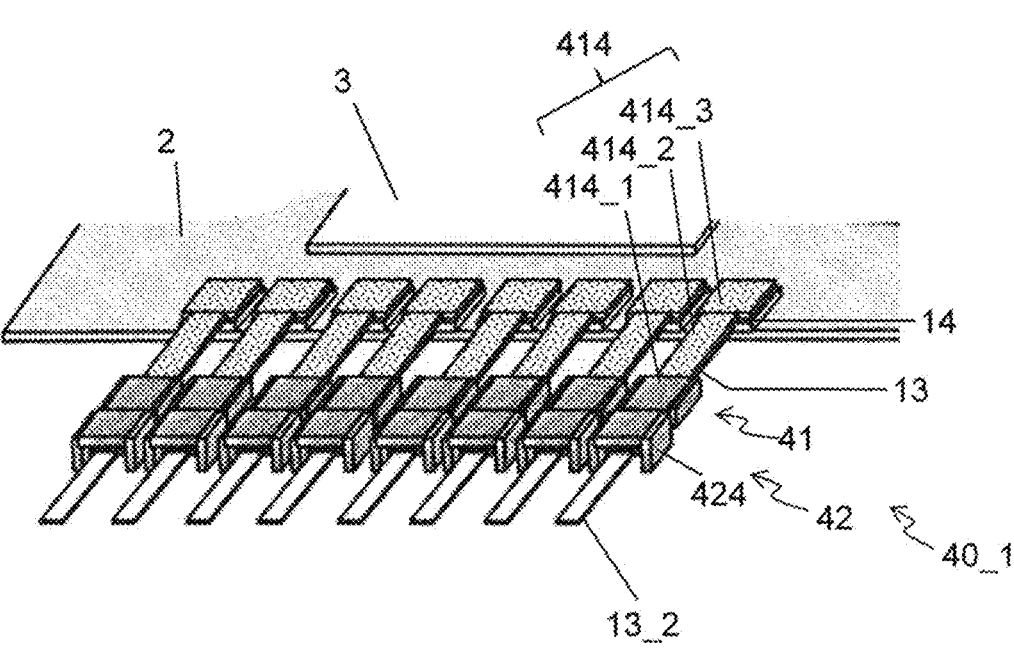
FIG. 13B is a perspective schematic view illustrating the mounting structure (after connection) of the optical module according to the modification of the fourth embodiment of the present invention.

FIGS. 13A and 13B are perspective views of a mounting structure 40_1 of an optical module according to a modification of the fourth embodiment before and after connection. In FIG. 13A, a magnet portion 414_1 and magnetic metal portions 414_2 and 414_3 are separately arranged in a longitudinal direction of the first magnetic component 414, and the magnetic metal portion 414_3 is integrated with the lid on the optical module 14 side.

Specifically, in the first optical connector 41, the first magnetic component is arranged around the ferrule 413, and the first magnetic component is constituted of a magnet including an upper surface (magnet portion 414_1). An end surface of a portion (magnetic metal portion) 414_2 constituted of a magnetic metal arranged above the first optical fibers 13 in the first magnetic component is connected to an end surface of an upper surface of the magnet portion 414_1 by magnetic force.

As described above, the magnet portion 414_1 of the first magnetic component 414 is arranged around the ferrule 413, and is connected to the second magnetic component 424 around the second optical connector 42 by exerting a magnetic force. Even with such a configuration, similar effects to those described above can be exhibited.

Second Modification of Fourth Embodiment

Figure 14A:
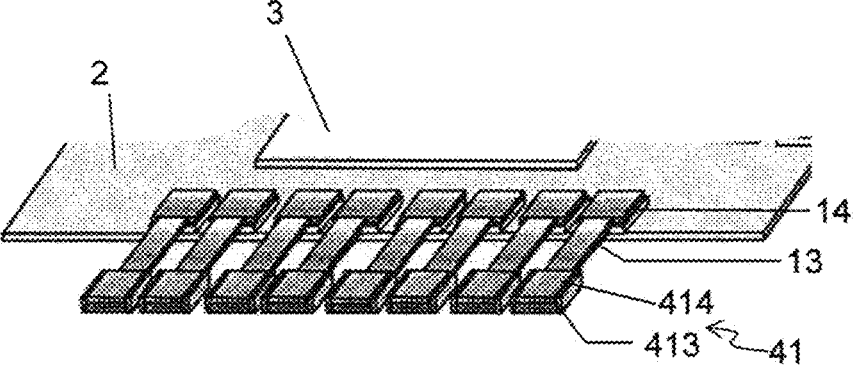
FIG. 14A is a perspective schematic view illustrating the mounting structure (before connection) of an optical module according to a modification of the fourth embodiment of the present invention.
Figure 14B:
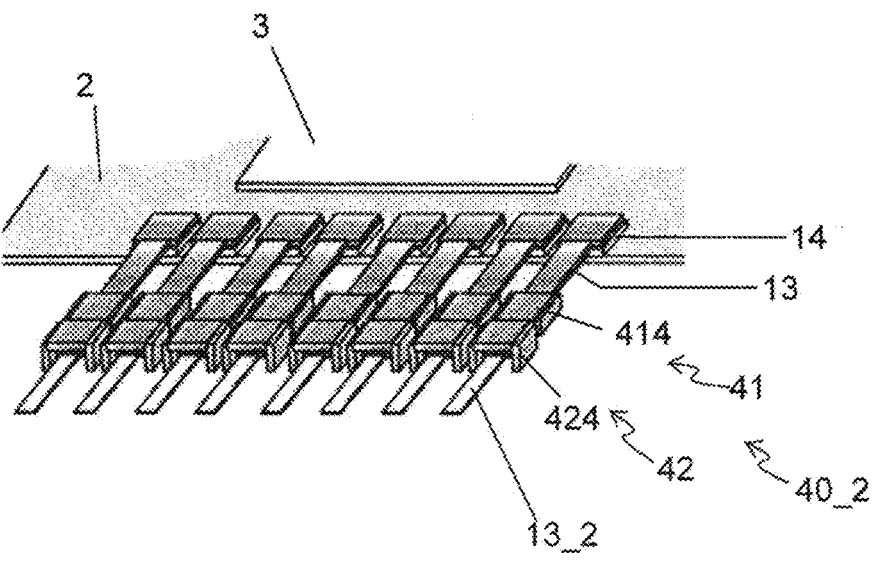
FIG. 14B is a perspective schematic view illustrating the mounting structure (after connection) of the optical module according to the modification of the fourth embodiment of the present invention.

FIGS. 14A and 14B are perspective views of a mounting structure 40_2 of an optical module according to a modification of the fourth embodiment before and after connection. In the present modification, the first magnetic component 414 integrated with the lid is entirely constituted of the permanent magnet of the hard magnetic material. The first magnetic component 414 is connected to the second magnetic component 424 around the second optical connector 42 by exerting a magnetic force.

Consequently, similar effects to those described above can be exhibited. In particular, by arranging the permanent magnet to be long in the longitudinal direction, the volume of the magnet can be greatly increased without increasing the cross-sectional area of a connection cross section, so that the magnetic force between the magnetic structures acting per unit volume can be more greatly exerted as compared with the above-described embodiment, and further space saving of mounting of the optical modules can be achieved.

Note that, in the present embodiment, the optical fibers are illustrated as an example of the connection target, but naturally, embodiments of the present invention can also be applied to connection between optical waveguides or connection between an optical waveguide and an optical fiber.

Fifth Embodiment

A mounting structure of an optical module according to a fifth embodiment of the present invention will be described with reference to FIGS. 15A to 17B.

Configuration of Mounting Structure of Optical Modules

Figure 15A:
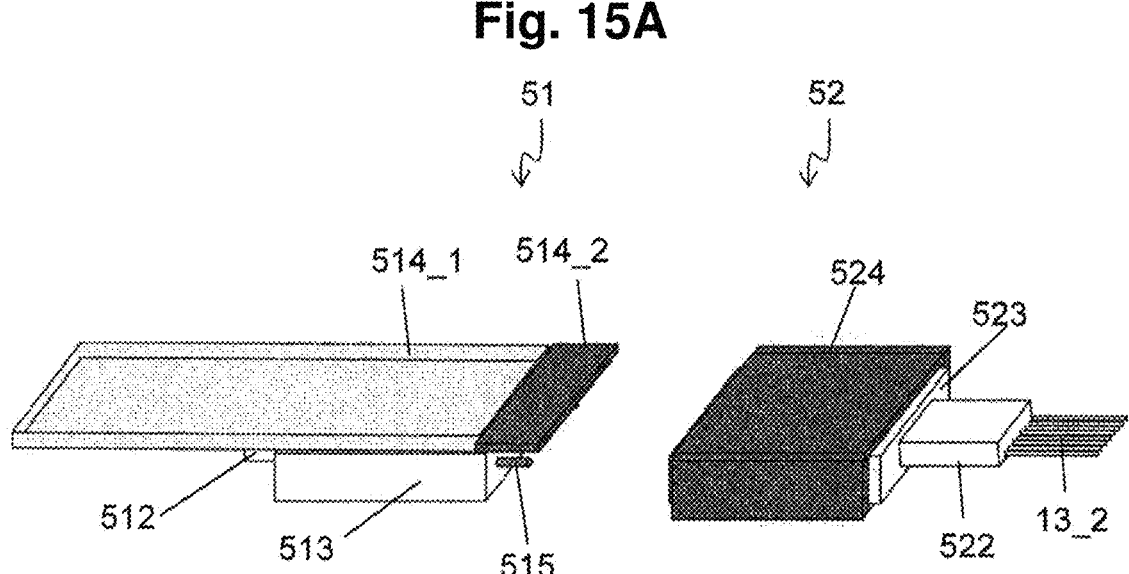
FIG. 15A is a perspective schematic view illustrating a mounting structure (before connection) of an optical module according to a fifth embodiment of the present invention.
Figure 15B:
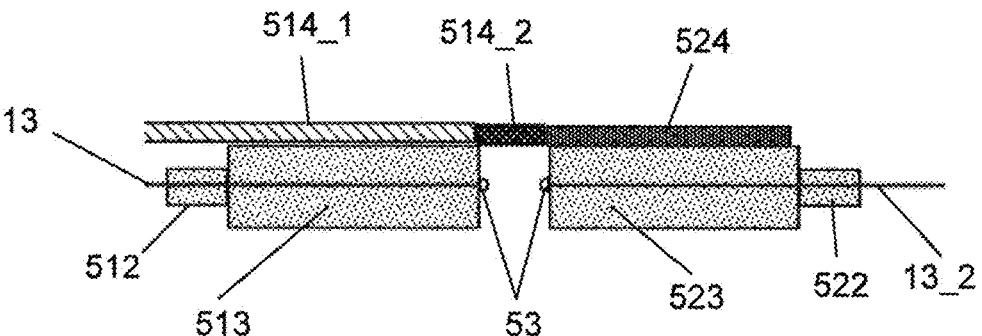
FIG. 15B is a side sectional view illustrating the mounting structure (after connection) of the optical module according to the fifth embodiment of the present invention.

FIG. 15A illustrates a perspective view before connection of a first optical connector 51 and a second optical connector 52 in the mounting structure of the optical module according to the present embodiment. FIG. 15B illustrates a side cross-sectional view of the mounting structure after connection. The basic configuration is substantially the same as that of the first modification of the fourth embodiment, the MT ferrule is used as the ferrule in the same manner as described above, guide pins are used as a positioning structure (not illustrated), and a magnetic component is arranged around the ferrule and integrated.

A first magnetic component 514 is integrated with the first optical connector 51 around the first optical connector 51 connected to the optical module 14 with the short fiber 13 interposed therebetween.

In addition, an upper surface portion of the first magnetic component 514 extends to the optical module 14, is integrated with the lid arranged around the optical module 14, and the magnetic metal portion and the magnet portion are separately connected in the longitudinal direction of the optical fibers.

In the present embodiment, as a difference from the first modification in the fourth embodiment, the first magnetic component 514 protrudes from an end surface of a ferrule 513 on the side connected to the second optical connector 52, and is constituted of a composite of a portion 514_1 from the optical module 14 side to the ferrule 513 and a protruding portion 514_2. The former portion 514_1 is constituted of SUS 430 which is a magnetic metal, and the latter portion 514_2 is constituted of the neodymium magnet, which is the hard magnetic material.

On the other hand, a second magnetic component 524 integrated with the second optical connector 52 connected to the first optical connector 51 is constituted of the neodymium magnet, which is the hard magnetic material.

With the above-described configuration, connection end surfaces of the first ferrule 513 and the plurality of optical fibers (first optical fibers) 13 incorporated in the ferrule 513 in the first optical connector 51 are accommodated in the magnetic metal portion 514_1, and a gap is generated between the connection end surfaces and connection end surfaces of the optical fibers (second optical fibers) 13_2 incorporated in a second ferrule 523 in the second optical connector 52.

In addition, the magnet portion (protrusion) 514_2 of the first magnetic component 514 is set to a predetermined length, and has a configuration in which an opening is provided so as not to interfere with each of guide pins (not illustrated) provided at one end of the optical connector and spatial light beams input and output from the optical fibers 13 and 13_2, and is connected to the magnetic metal portion 514_1 of the first magnetic component 514.

In addition, a microlens array structure 53 as described above is provided near the connection end surface of each of the optical fibers 13 and 13_2 to be connected. An antireflection film is formed on the end surface of a microlens to suppress Fresnel reflection with air. Note that a microlens component may be separately arranged near each of the connection end surfaces.

With such a configuration, various effects similar to the effects described in the fourth embodiment can be exhibited.

In addition, in the present embodiment, since the optical connection is made by the spatial optical system, the pressing force required for connection between the connectors may be small as compared with PC connection, butt coupling via an alignment agent, or the like. In this manner, it is possible to further miniaturize the magnetic component and to further save the space for mounting the optical modules.

First Modification of Fifth Embodiment

Figure 16A:
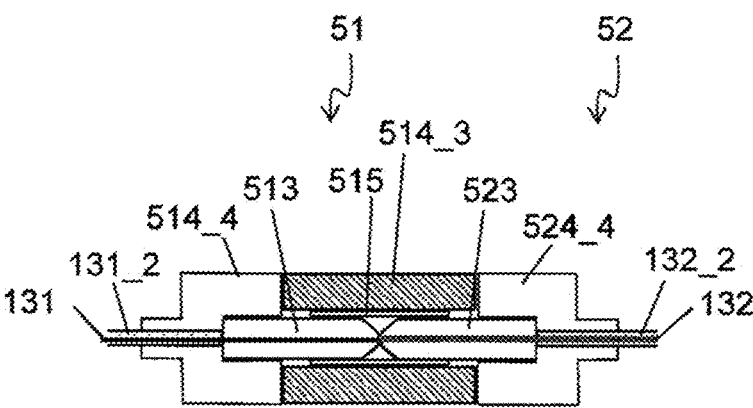
FIG. 16A is a side cross-sectional view illustrating the mounting structure (after connection) of the optical module according to a modification of the fifth embodiment of the present invention.

As illustrated in FIG. 16A, the ferrule may be a cylindrical ferrule used for a single-core connector to fix a plurality of optical fibers.

In a case of using the cylindrical ferrule, positioning between the cylindrical ferrules connected to face each other is performed not by the guide pins but by being housed in a known split sleeve.

Figure 16B:
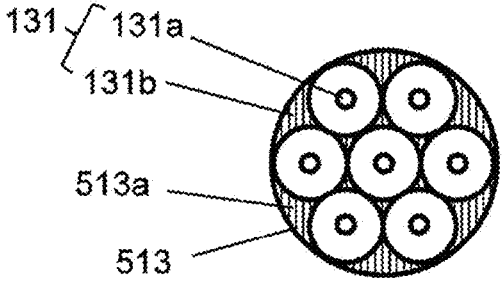
FIG. 16B is a front cross-sectional view of an example of a ferrule in the mounting structure of the optical module according to the modification of the fifth embodiment of the present invention.
Figure 16C:
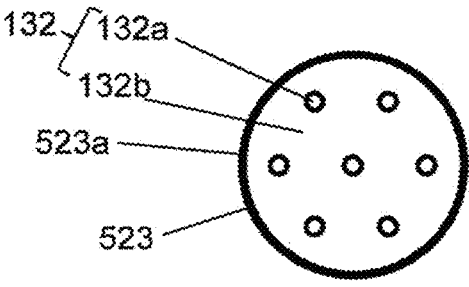
FIG. 16C is a front cross-sectional view of an example of the ferrule in the mounting structure of the optical module according to the modification of the fifth embodiment of the present invention.

In the present modification, an example using the fan-in/fan-out structure for the multicore fibers will be described. FIGS. 16B and 16C are cross-sectional views of the ferrule 513 of the first optical connector 51 and the ferrule 523 of the second optical connector 52, respectively.

The cylindrical ferrule constituted of zirconia or the like is used as the ferrule 513 of the first optical connector 51, and one microhole in the cylindrical ferrule can be filled with a plurality of fibers 131 having a reduced diameter to perform positioning. A small-diameter fiber 131 includes a core 131a and a clad 131b, and the plurality of small-diameter fibers 131 is fixed with an adhesive 513a.

A multicore fiber 132 including cores 132a and a clad 132b is accommodated in the ferrule 523 of the second optical connector 52, and is fixed in the ferrule 523 with an adhesive 523a.

In this configuration, the cores 131a of the small-diameter fiber 131 and the cores 132a of the multicore fiber 132 are made to correspond to each other by the fan-in/fan-out structure, so that multi-fiber optical connection can be achieved.

The first optical connector 51 in the mounting structure according to the present modification includes the cylindrical ferrule 513, a split sleep 515, and a first magnetic component 514. The first magnetic component 514 includes a flange 514_4 on a proximal end side (optical fiber 13 side) and a magnet portion 514_3 on a distal end side (connection side with the second optical connector 52). Here, the flange 514_4 is constituted of SUS 430 which is a magnetic metal. The magnet portion 514_3 has a through hole into which the split sleep 515 is inserted.

In the first optical connector 51, the cylindrical ferrule 513 inserted (fitted) into and fixed to the hole (recess) of the flange 514_4 is inserted into and fixed to the split sleep 515 in the through hole of the magnet portion 514_3.

The second optical connector 52 includes the cylindrical ferrule 523 and the second magnetic component 524. The second magnetic component 524 is constituted of a flange 524_4 of SUS 430 that is a magnetic metal, and the cylindrical ferrule 523 is inserted (fitted) and fixed in a hole (recess) of the flange 524_4.

The cylindrical ferrule 523 of the second optical connector 52 is inserted into the split sleep 515 in the through hole of the magnet portion 514_3 in the first magnetic component 514 of the first optical connector 51, and the first optical connector 51 and the second optical connector 52 are connected.

Furthermore, the flange portion 514_4 of the first magnetic component 514 and the magnetic portion 514_3 connected in the longitudinal direction of the optical fibers are defined as permanent magnets. Thus, a magnetic force acts between the first magnetic component 514 and the second magnetic component 524. Consequently, the magnetic force is transmitted between the ferrules, and a pressing force necessary for the PC connection can be applied to the connection end surface.

By arranging the connection structures of the first optical connector 51 and the second optical connector 52 in an array, the connection structure of the plurality of optical connectors can be achieved without using a spring component (not illustrated).

As described above, similar effects to those of the fourth embodiment can be exhibited. Furthermore, as compared with a multicore ferrule such as an MT ferrule, for example, the ferrule can be miniaturized, and further space saving of mounting of the optical modules can be achieved.

Note that, in the present embodiment, the optical fibers are illustrated as an example of the connection target, but naturally, embodiments of the present invention can also be applied to connection between optical waveguides or connection between an optical waveguide and an optical fiber.

Sixth Embodiment

A mounting structure of an optical module according to a sixth embodiment of the present invention will be described with reference to FIGS. 17A to 18.

<Configuration of Mounting Structure of Optical Modules>

Figure 17A:
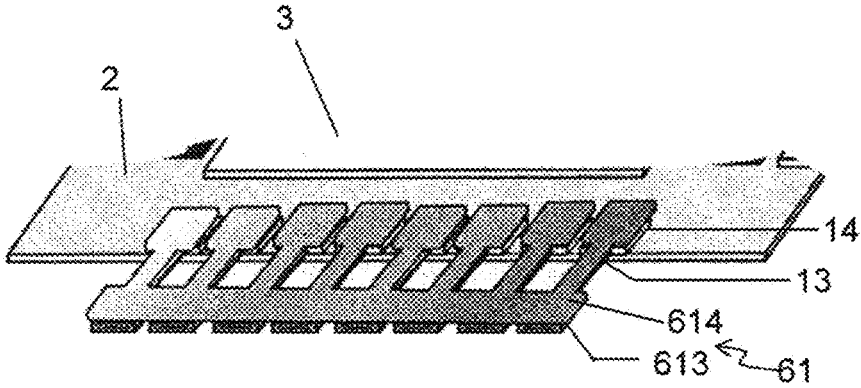
FIG. 17A is a perspective schematic view illustrating a mounting structure (before connection) of an optical module according to a sixth embodiment of the present invention.
Figure 17B:
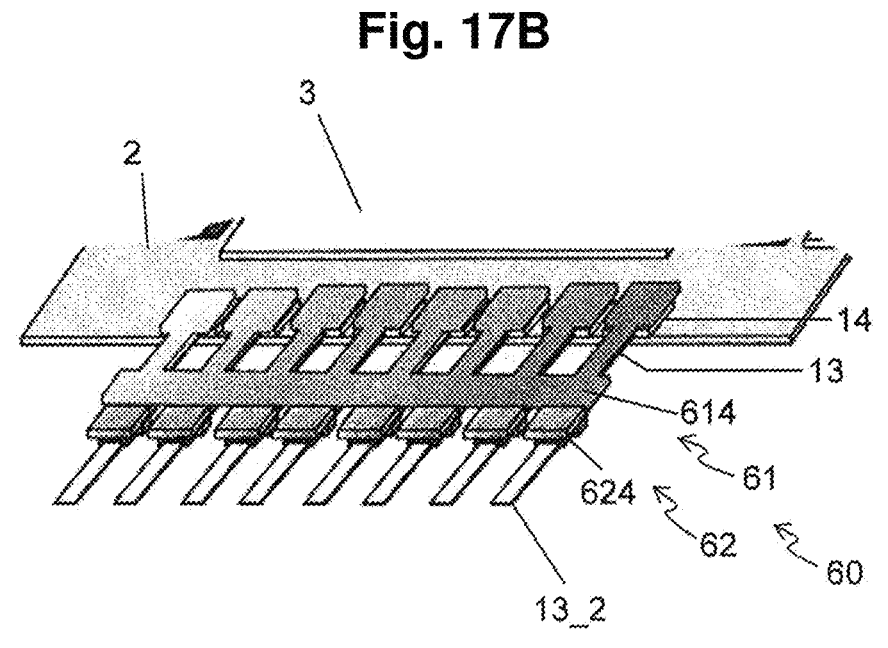

FIGS. 17A and 17B are perspective views of a mounting structure 60 of an optical module according to the sixth embodiment of the present invention before and after connection, respectively. The sixth embodiment can be applied to any of the first to fifth mounting forms, and relates to array arrangement and coupling of a plurality of optical connector connection structures in consideration of the CPO form.

As in the above-described embodiments, in the mounting structure 60, a plurality of first optical connectors 61 drawn out from the plurality of optical modules 14 is arranged side by side on the array around the substrate 2.

In the mounting structure 60 according to the present embodiment, first magnetic components 614 around the plurality of first optical connectors 61 are connected and integrated. For example, the first magnetic components 614 are SUS 430 which is a magnetic metal. The first magnetic components 614 are connected to second magnetic components 624 on an upper portion of a second optical connector 62 by exerting a magnetic force.

With such a configuration, in addition to that various effects similar to the effects described in the first to fifth embodiments can be exhibited, it is not necessary to arrange the magnetic components individually around the plurality of arranged first optical connectors 61, the number of members can be reduced by using shared magnetic components, and the distance between the first optical connectors 61 can be minimized.

Furthermore, the sizes of the magnetic components can be increased, and the magnetic force to be exerted can be further increased by increasing the size of the magnetic circuit. This means that the sizes of the connection cross-sectional areas of the magnetic components necessary for exerting the necessary magnetic force can be miniaturized. Consequently, further space saving of mounting of the optical modules can be achieved.

Here, the example in which the shared first magnetic components 614 are integrated with or connected to the metal lid near the optical modules 14 has been described, but as described in the first embodiment, the first magnetic components 614 may be separated from the lid as necessary.

In addition, the example in which all the shared first magnetic components 614 are the magnetic metal has been described, but naturally, all of the first magnetic components 614 may be constituted of magnets. In this case, single-pole magnets of NS may be used, but as described above, multipole magnets can be arranged in an array.

Figure 18:
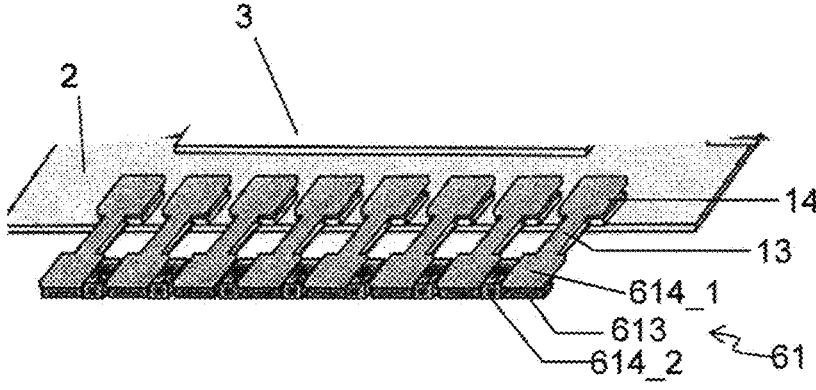
FIG. 18 is a perspective schematic view illustrating an example of the mounting structure (before connection) of the optical module according to the sixth embodiment of the present invention.

As illustrated in FIG. 18, in a case where the plurality of first optical connectors 61 drawn out from the plurality of optical modules 14 is arranged side by side in an array around the substrate 2, and the first magnetic components 614 on the side of each of the first optical connectors 61 are made of a composite of SUS 430 of the magnetic metal, which is the soft magnetic material, and the neodymium magnet, which is the hard magnetic material, magnetic components 614_2 may be added between the plurality of first magnetic components 614, so as to cause a magnetic force to act between the magnetic components to couple the first magnetic components.

Alternatively, a combination of an integrated magnetic metal shared by the optical connectors and magnets provided respectively in the optical connectors may be employed, and any magnetic components such as a multi-polar magnet or a combination of a magnet and a magnetic metal can be applied as described above.

Seventh Embodiment

A mounting structure of an optical module according to a seventh embodiment of the present invention will be described with reference to FIGS. 19A to 20B.

Configuration of Mounting Structure of Optical Modules

Figure 19A:
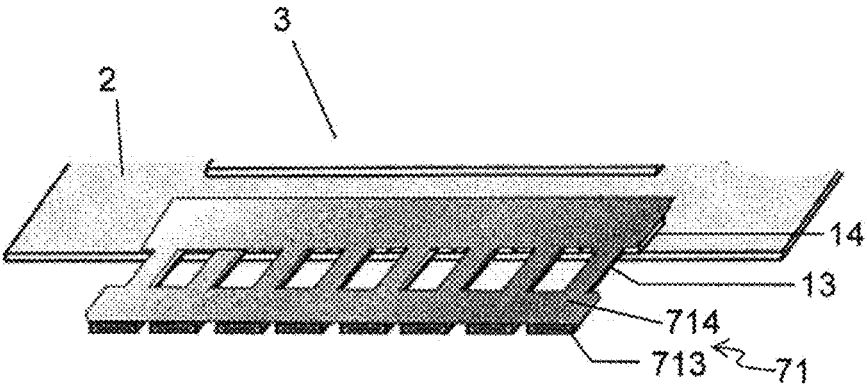
FIG. 19A is a perspective schematic view illustrating a mounting structure (before connection) of an optical module according to a seventh embodiment of the present invention.
Figure 19B:
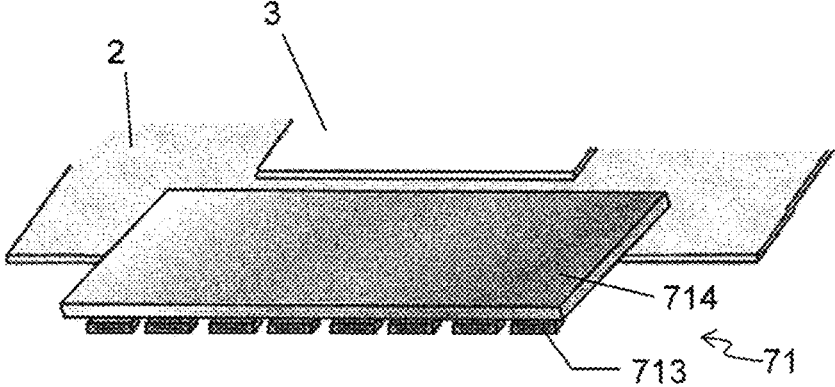
FIG. 19B is a perspective schematic view illustrating the mounting structure (before connection) of optical modules according to the seventh embodiment of the present invention.

FIGS. 19A and 19B are perspective views of a mounting structure 70 of an optical module according to the seventh embodiment of the present invention before and after connection, respectively. The seventh embodiment can be applied to any of the first to sixth mounting forms, and relates to array arrangement and coupling of a plurality of optical connector connection structures in consideration of the CPO form.

As in the above-described embodiments, in the mounting structure 70, a plurality of first optical connectors 71 drawn out from the plurality of optical modules 14 is arranged side by side on the array around the substrate 2.

At this time, a first magnetic component 714 is arranged around the first optical connectors 71, but as in the sixth embodiment, the first magnetic component 714 is arranged so as to integrate the plurality of first optical connectors 71. For example, the first magnetic component 714 is SUS 430 that is a magnetic metal.

Furthermore, in the present embodiment, the first magnetic component 714 is also integrated or coupled with the metal lid near the optical modules 14, and the metal lid is shared so as to be collectively provided around the plurality of optical modules 14.

As illustrated in FIG. 19A, the first magnetic component 714 connecting the lid portion and the optical connector portion is divided on each of the plurality of optical fibers 13. Alternatively, as illustrated in FIG. 19B, the first magnetic component may be shared also on the plurality of optical fibers 13 drawn out from the plurality of optical modules 14.

In this manner, various effects similar to the effects described in the first to sixth embodiments can be exhibited, and in addition, the number of members can be further reduced by also making the lid a magnetic component shared among a plurality of optical modules.

In addition, the size of the first magnetic component 714 can be increased, and the magnetic circuit can be enlarged to further increase the magnetic force to be exerted. This means that the size of the connection cross-sectional area of the magnetic component necessary for exerting the necessary magnetic force can be miniaturized.

Consequently, further space saving of mounting of the optical modules can be achieved.

In addition, there is a secondary effect that the surface area of the lid portion for heat dissipation can be further increased.

Figure 20A:
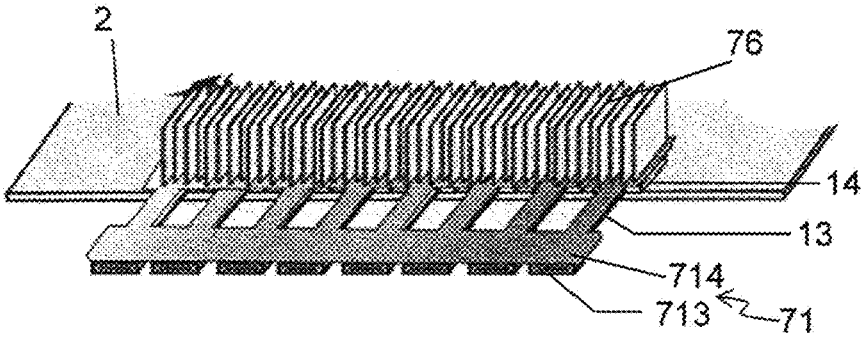
FIG. 20A is a perspective schematic view illustrating an example of the mounting structure (before connection) of optical modules according to the seventh embodiment of the present invention.
Figure 20B:
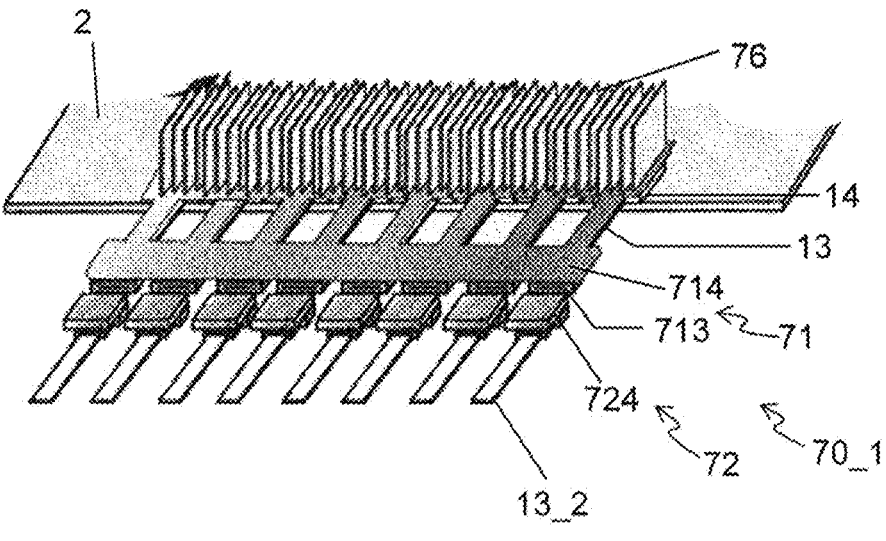
FIG. 20B is a perspective schematic view illustrating an example of the mounting structure (after connection) of optical modules according to the seventh embodiment of the present invention.

Note that, in order to further enhance the heat dissipation, as in the mounting structure 70_1 illustrated in FIGS. 20A and 20B, the magnetic component may be provided with a structure 76 that increases the surface area, for example, a heat dissipation fin structure or the like, so that the surface area of the lid portion can be further increased. In addition, although not illustrated, a member having a high thermal conductivity may be separately attached on the lid to efficiently transfer heat to the optical connector side. For example, a graphite sheet, a heat pipe, or the like may be further integrated on the lid.

Note that, the example in which all of the shared first magnetic component 714 is the magnetic metal has been described, but naturally, the all may be constituted of a magnet. In this case, a single-pole magnet of NS may be used, but as described above, multipole magnets can be arranged in an array. In addition, a combination of a magnetic metal and a magnet may be used.

In addition, in the present embodiment, the optical fibers are illustrated as an example of the connection target, but naturally, embodiments of the present invention can also be applied to connection between optical waveguides or connection between an optical waveguide and an optical fiber.

Eighth Embodiment

Figure 21A:
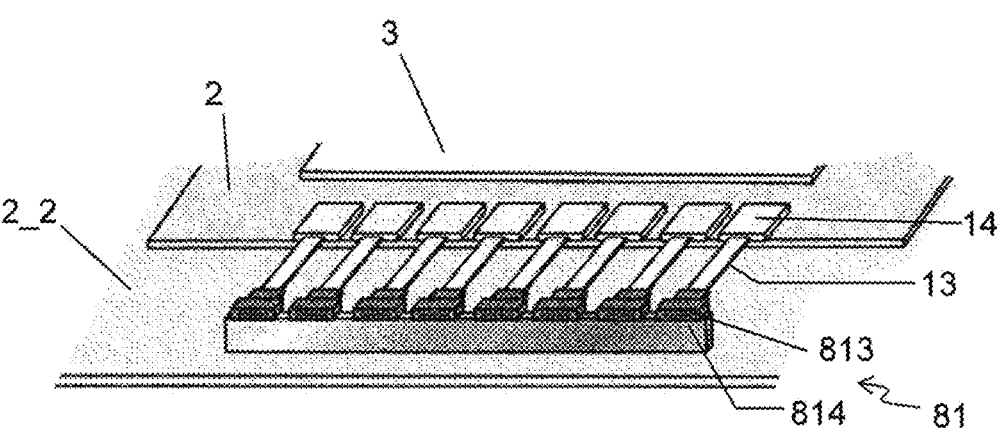
FIG. 21A is a perspective schematic view illustrating a mounting structure (before connection) of an optical module according to an eighth embodiment of the present invention.
Figure 21B:
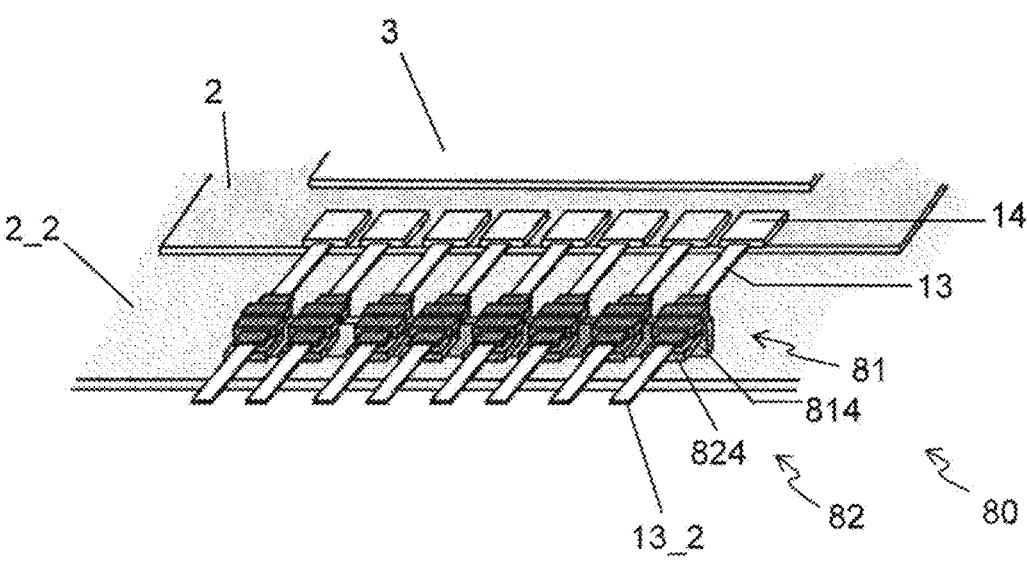
FIG. 21B is a perspective schematic view illustrating the mounting structure (after connection) of optical modules according to the eighth embodiment of the present invention.
Figure 22A:
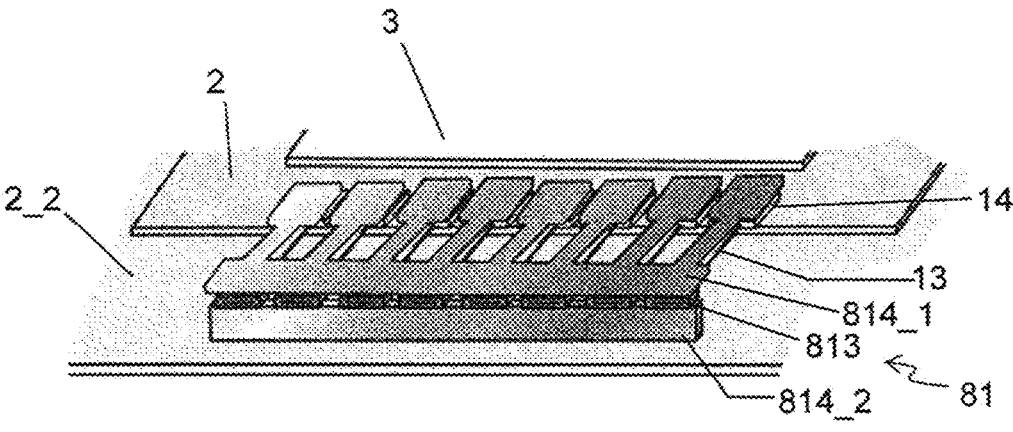
FIG. 22A is a perspective schematic view illustrating an example of the mounting structure (before connection) of optical modules according to the eighth embodiment of the present invention.
Figure 22B:
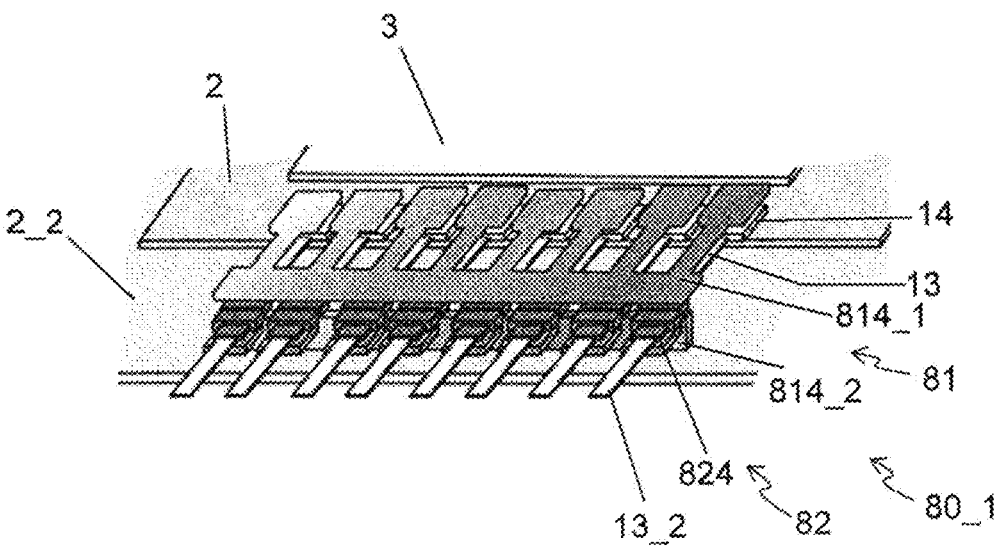
FIG. 22B is a perspective schematic view illustrating an example of the mounting structure (after connection) of optical modules according to the eighth embodiment of the present invention.

A mounting structure of an optical module according to an eighth embodiment of the present invention will be described with reference to FIGS. 21A to 22B.
Configuration of Mounting Structure of Optical Modules FIGS. 21A and 21B are perspective views of a mounting structure 80 of an optical module according to an eighth embodiment of the present invention. Components and a connection structure are substantially the same as those of the first embodiment, but the substrate 2 on which the integrated circuit 3 and the plurality of optical modules 14 are mounted is mounted on a different second substrate (board) 2_2, and the substrates are electrically connected to each other.

A first magnetic component 814 provided around a first optical connector 81 is provided on a lower portion (substrate side) of the first optical connector 81, and the first magnetic component 814 is mounted on the second substrate 2_2. The first magnetic component 814 is connected to a second magnetic component 824 on a lower portion (substrate side) of a second optical connector 82 by exerting a magnetic force. Here, the first magnetic component 814 may be shared among the optical connectors as illustrated in FIG. 21A, or may be divided as illustrated in FIG. 21B.

In this manner, various effects completely similar to the effects described in the first embodiment can be exhibited.

In addition, by being mounted in the lower portion (substrate 2 side) of the first optical connector 81, the space for accommodating the magnetic components can be made larger than the upper portion and the periphery. At this time, the lower space between the magnetic components is originally an empty space, and does not impair high-density mountability.

Consequently, the magnetic force acting per unit cross-sectional area can be more greatly exerted, and further space saving of mounting of the optical modules can be achieved.

In addition, it is possible to prevent the optical fibers and the optical connector drawn out from the optical module from sagging due to gravity and support the optical fibers, and prevent an excessive stress from being applied to the optical fibers.

Consequently, the effect of physically protecting the short optical fibers connected to the optical module can also be secondarily exhibited.

Naturally, a combination with the first to seventh embodiments may be made. For example, as in a mounting structure 80_1 illustrated in FIGS. 22A and 22B, a lid and a first magnetic component 814_1 shared between the respective optical connectors may be used on an upper portion of the first optical connector 81, and another first magnetic component 814_2 may be provided on the lower portion (substrate 2 side) of the first optical connector 81 and mounted on the second substrate 2_2. The another first magnetic component 814_2 is connected to the second magnetic component 824 on the lower portion (substrate side) of the second optical connector 82 by exerting a magnetic force. As described above, it is sufficient if a part of the first magnetic component 814 is mounted on the second substrate 2_2 electrically connected to the substrate 2.

In addition, in the present embodiment, the optical fibers are illustrated as an example of the connection target, but naturally, embodiments of the present invention can also be applied to connection between optical waveguides or connection between an optical waveguide and an optical fiber.

Ninth Embodiment

Figure 23A:
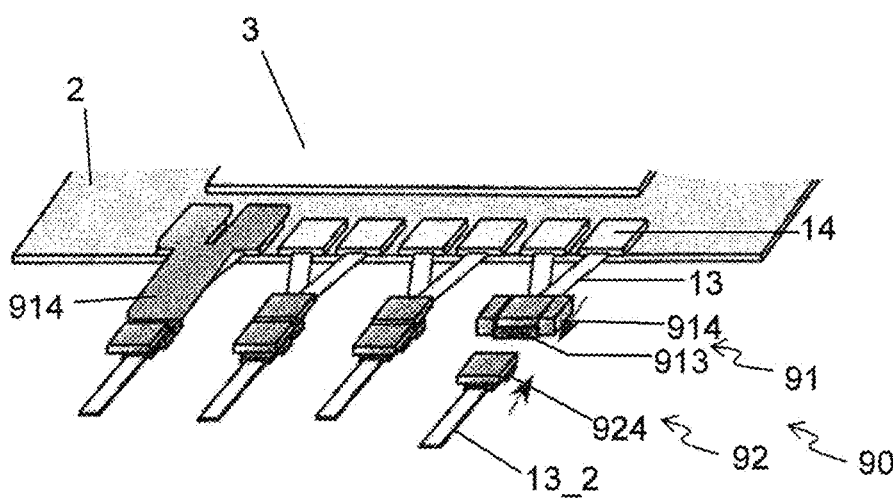
FIG. 23A is a perspective schematic view illustrating an example of a mounting structure of an optical module according to a ninth embodiment of the present invention.
Figure 23B:
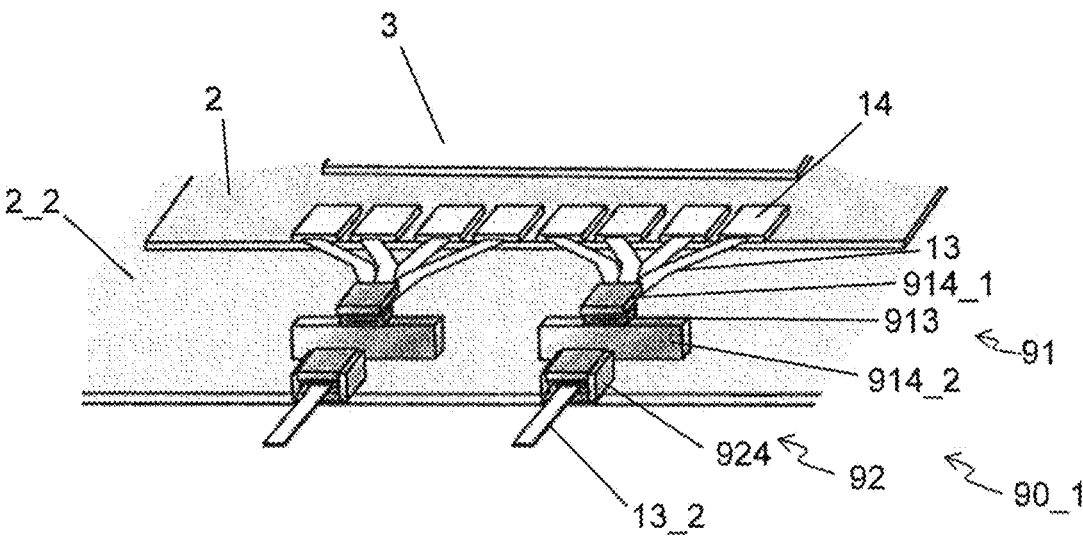
FIG. 23B is a perspective schematic view illustrating an example of the mounting structure of the optical module according to the ninth embodiment of the present invention.

A mounting structure of an optical module according to a ninth embodiment of the present invention will be described with reference to FIGS. 23A to 23B.
Configuration of Mounting Structure of Optical Modules FIGS. 23A and 23B are perspective views of a mounting structure 90 of an optical module according to a ninth embodiment of the present invention. The mounting structure may be any combination of the first to eighth embodiments. The present embodiment is different from the above-described embodiments in an aspect in which a plurality of optical fibers 13 from the optical module 14 is accommodated in a first optical connector 91.

As illustrated in FIGS. 23A and 23B, the first optical connector 91 accommodates a plurality of optical fiber groups 13 drawn out from two or more optical modules 14. FIG. 23A illustrates an arrangement example in which two optical fiber groups (pluralities of optical fibers) 13 are accommodated in one first optical connector 91.

A right drawing in the drawing illustrates the mounting structure 90 before connection, and the middle two drawings in the drawing illustrate the mounting structure 90 after connection. A left drawing in the drawing illustrates a mode in which an upper surface of a first magnetic component 914 extends to above the optical module 14. The first magnetic component 914 is provided around the first optical connector 91 or on a portion (upper portion, side portion, or the like) of the periphery thereof. The first magnetic component 914 is connected to a second magnetic component 924 on an upper portion of a second optical connector 92 by exerting a magnetic force. In this arrangement example, an example of being arranged on the substrate 2 has been described, but a second substrate may be used for arrangement.

FIG. 23B illustrates an arrangement example in which four optical fiber groups (pluralities of optical fibers) 13 are accommodated in one first optical connector 91. In a mounting structure 90_1, a first magnetic component 914_1 is provided on an upper portion of the first optical connector 91, and further, another first magnetic component 914_2 is provided on a lower portion (substrate side) of the first optical connector 91, and the another first magnetic component 914_2 is mounted on the second substrate 2_2. The first magnetic components 914_1 and 914_2 are connected to the second magnetic component 924 around the second optical connector 92 by exerting a magnetic force. In this arrangement example, the example in which the substrate 2 and the second substrate 2_2 are used has been described, but the substrate 2 may be used alone for arrangement.

In this manner, various effects completely similar to the effects described in the first to eighth embodiments can be exhibited, and in addition, the number of optical connectors to be connected can be reduced, and further space saving of mounting of the optical modules can be achieved.

In addition, in the connection between the plurality of optical fibers and the optical module, the longitudinal direction of the optical fibers to be connected may be obliquely taken out without being orthogonal to the connection end surface of the optical module. This is used when the optical circuit is formed obliquely with respect to a direction orthogonal to the connection end surface in the PIC of the optical module and reflected return light is suppressed. In such a case, as described in the present embodiment, there is a secondary effect that it is suitable for aggregating a plurality of optical fiber groups into an optical connector and is also excellent in mountability.

Note that, in the above-described embodiments including the present embodiment, an example has been described in which one group of a plurality of optical fibers is taken out from one optical module, but embodiments of the present invention can be similarly applied to a case where two or more of pluralities of optical fiber groups or pluralities of optical waveguides are taken out from one optical module.

Tenth Embodiment

A mounting structure of an optical module according to a tenth embodiment of the present invention will be described with reference to FIGS. 24A to 25B.

Configuration of Mounting Structure of Optical Modules

Figure 24A:
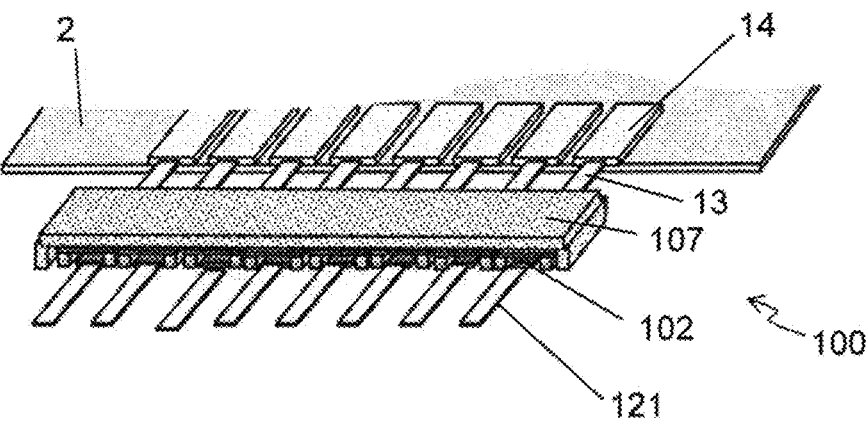
FIG. 24A is a perspective schematic view illustrating a mounting structure (after connection) of an optical module according to a tenth embodiment of the present invention.

FIG. 24A is a perspective view of a mounting structure 100 of an optical module according to the tenth embodiment of the present invention. The mounting structure may be any combination of the first to ninth embodiments. The present embodiment is different from the above-described embodiments in further including a plate component 107 arranged to be in contact with both of the first and second magnetic components 1014 and 1024 after connection of first and second optical connectors 101 and 102.

Figure 24B:
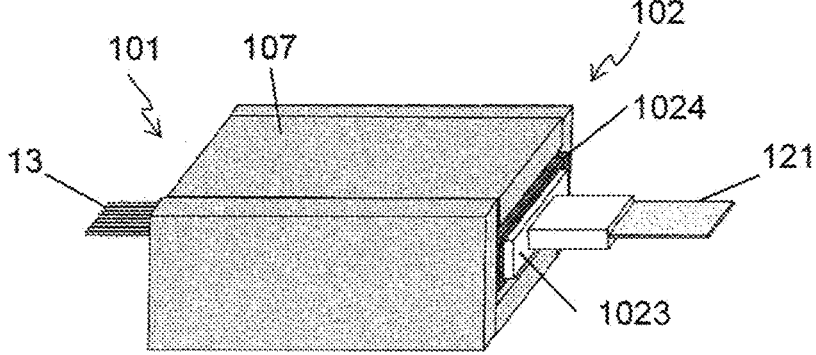
FIG. 24B is a perspective schematic view illustrating an optical connector (after connection) in the mounting structure of the optical module according to the tenth embodiment of the present invention.

As illustrated in FIG. 24B, the plate component 107 surrounding the periphery of each of the pair of connected first and second magnetic components 1014 and 1024 is provided. The plate component 107 is constituted of the soft magnetic material, and constituted of, for example, SUS 430, nickel, or the like. Although FIG. 24B illustrates an example in which the plate component 107 surrounding the connection structure of the pair of first and second magnetic components 1014 and 1024 (first and second optical connectors 101 and 102) is used, the plate component 107 surrounding the connection structure of the plurality of first and second optical connectors 101 and 102 may be used.

With such a structure, in addition to that similar effects to the effects described in the first to ninth embodiments can be exhibited, it is possible to prevent leakage of magnetic lines of force acting between the first and second magnetic components 1014 and 1024 to the external space and to strengthen confinement of the magnetic circuit at the connection portions of the first and second optical connectors 101 and 102.

Consequently, the magnetic force in the same volume can be increased, and further space saving of mounting of the optical modules can be achieved.

Note that the plate component 107 does not need to be in contact with the entire periphery of the outer periphery, and may be a plate component in contact with at least one surface. In addition, preventing leakage of magnetic lines of force to the outside leads to reduction of the influence of magnetic force to the outside, and secondary effects that sticking of the magnet to the peripheral member is prevented and adverse effects on other electronic components due to the magnetic field can be eliminated are also exhibited.

The shape of the plate component in the present embodiment is arbitrary, and the outer periphery of the magnetic component may be a machined structure or a structure in contact with at least one surface as necessary.

Figure 25A:
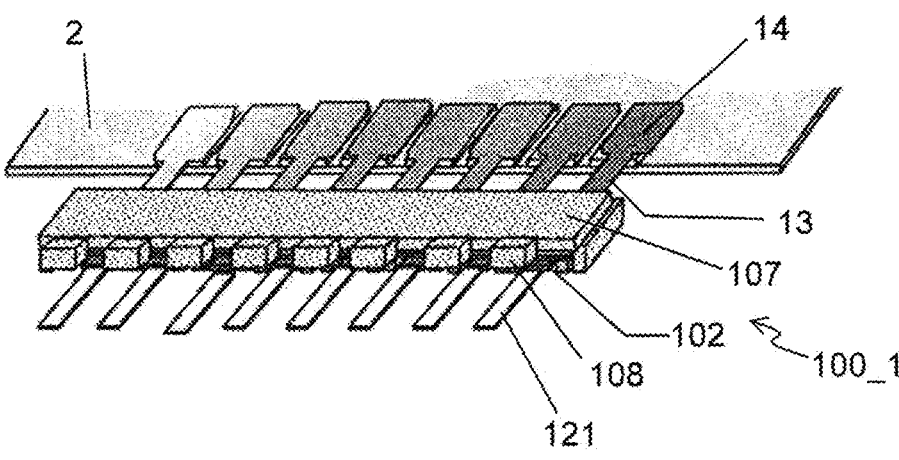
FIG. 25A is a perspective schematic view illustrating the mounting structure (after connection) of optical modules according to a modification of the tenth embodiment of the present invention.
Figure 25B:
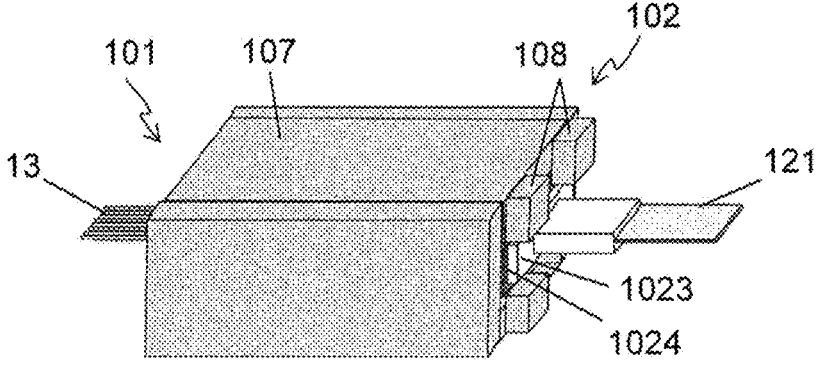
FIG. 25B is a perspective schematic view illustrating an optical connector (after connection) in a mounting structure of an optical module according to a modification of the tenth embodiment of the present invention.

FIG. 25A illustrates a mounting structure 100_1 of an optical module according to a modification of the present embodiment. In the present embodiment, the shared plate component 107 that collectively surrounds the connection structure of the plurality of first optical connectors 101 and second optical connectors 102 is used. In addition, as illustrated in FIG. 25B, the plate component 107 surrounding a connection structure of a pair of the first optical connector 101 and the second optical connector 102 may be used.

In addition, a stopper structure 108 that is coupled to the second magnetic component 1024 in a longitudinal direction of the second optical connector 102 and restricts movement in a direction facing a connector connection end is provided.

In this manner, in addition to that the effects similar to those described above are exhibited, even when stress is applied to the second optical connector 102 in a direction in which the connection is released along the longitudinal direction of the optical fibers, disconnection can be prevented by mechanical interference of the stopper structure 108, and stable optical connection can be maintained. Note that a configuration may be employed in which a magnetic structure is also used for the stopper structure 108 to apply a magnetic repulsive force to the second magnetic component 1024.

In the described embodiments of the present invention, an arrangement example of the first magnetic component and the second magnetic component has been described, but embodiments of the present invention are not limited thereto. As the arrangement of the first magnetic component and the second magnetic component, any of the arrangements illustrated in FIGS. 5A to 5K and FIGS. 7A to 7F may be used, and of course, any combination that can be analogized other than those illustrated in FIGS. 5A to 5K and FIGS. 7A to 7F may be used. The first magnetic component is only required to be arranged around the first optical connector or on a portion (upper portion, lower portion, side portion, and the like) of the periphery thereof, the second magnetic component is only required to be arranged around the second optical connector or on a portion (upper portion, lower portion, side portion, and the like) of the periphery thereof, and the first magnetic component and the second magnetic component are only required to be arranged so as to be connected to each other by exerting a magnetic force therebetween.

As described above, various embodiments have been described by taking the first to tenth embodiments as examples, but naturally, embodiments of the present invention can be applied to any combination of the connection target, the connection structure, the connection end surface structure, the connector structure, the structure, arrangement, and connection form of the magnetic components, the lid structure, the material and arrangement of various components, and the like described in the first to tenth embodiments.

In the described embodiments of the present invention, examples of the structure, dimensions, materials, and the like of each component have been described in the configuration and manufacturing method of the optical module, but embodiments of the present invention are not limited thereto. Any optical module may be used as long as the optical module exhibits a function and an effect.

INDUSTRIAL APPLICABILITY

Embodiments of the present invention relate to a compact optical connection component and optical connection structure, and can be applied to devices and systems of optical communication or the like.

REFERENCE SIGNS LIST

2 Substrate
10 Connection structure of optical module
11 First optical connector
12 Second optical connector
13 First optical waveguide component
13_2 Second optical waveguide component
14 Optical module
114 First magnetic component
124 Second magnetic component

The invention claimed is:

1. An optical module mounting structure, the mounting structure comprising:
an optical module;
a first optical waveguide component optically connected to the optical module;
a first optical connector accommodating the first optical waveguide component;
a second optical connector;
a second optical waveguide component accommodated in the second optical connector;
a first magnetic component arranged with the first optical connector;

a second magnetic component arranged with the second optical connector, wherein the first magnetic component or the second magnetic component comprises a hard magnetic material; and
a lid component arranged on the optical module, wherein the first magnetic component is configured to extend to the optical module by passing above the first optical waveguide component and is coupled to or integrated with the lid component.

2. The mounting structure according to claim 1, wherein the first magnetic component comprises a magnetic metal component comprising a soft magnetic material.

3. The mounting structure according to claim 2, wherein:
the optical module comprises a plurality of optical modules; and
the lid component is arranged around the plurality of optical modules.

4. The mounting structure according to claim 2, further comprising a heat dissipation structure in the lid component or the first magnetic component.

5. The mounting structure according to claim 1, wherein the first magnetic component comprises a magnetic metal component comprising a soft magnetic material and a permanent magnet component comprising the hard magnetic material.

6. The mounting structure according to claim 5, wherein:
the optical module comprises a plurality of optical modules; and
the lid component is arranged around the plurality of optical modules.

7. The mounting structure according to claim 5, further comprising a heat dissipation structure in the lid component or the first magnetic component.

8. The mounting structure according to claim 1, wherein the first magnetic component comprises a permanent magnet component comprising the hard magnetic material.

9. The mounting structure according to claim 8, wherein:
the optical module comprises a plurality of optical modules; and
the lid component is arranged around the plurality of optical modules.

10. The mounting structure according to claim 8, further comprising a heat dissipation structure in the lid component or the first magnetic component.

11. The mounting structure according to claim 1, wherein:
the first optical connector comprises a plurality of first optical connectors; and
the first magnetic component is coupled to the plurality of first optical connectors.

12. The mounting structure according to claim 1, further comprising:
a first substrate on which the optical module is mounted; and
a second substrate on which the first magnetic component is mounted.

13. The mounting structure according to claim 1, wherein:
the optical module comprises a plurality of optical modules;
the first optical waveguide component comprises a plurality of first optical waveguide components; and
the first optical connector accommodates two or more of the plurality of first optical waveguide components and is optically connected to two or more of the plurality of optical modules.

14. The mounting structure according to claim 1, further comprising a plate component comprising a soft magnetic material, wherein the plate component is in contact with the first magnetic component and the second magnetic component.

15. The mounting structure according to claim 14, wherein the plate component comprises a stopper structure configured to restrict movement in a direction facing a connection end in a longitudinal direction of the second optical connector after connection.

16. The mounting structure according to claim 1, further comprising:
   a first substrate on which the optical module is mounted; and
   a second substrate on which the first substrate is mounted and which is electrically connected to the first substrate, wherein the first magnetic component is disposed on a side of the first optical connector facing the second substrate, and is mounted on the second substrate.

17. An optical mounting board, the optical mounting board comprising:
   a first substrate;
   an optical module mounted on the first substrate;
   a first optical waveguide component optically connected to the optical module;
   a first optical connector accommodating the first optical waveguide component;
   a second optical connector;
   a second optical waveguide component accommodated in the second optical connector;
   a first magnetic component coupled to the first optical connector;
   a second magnetic component coupled to the second optical connector, wherein the first magnetic component or the second magnetic component comprises a hard magnetic material;
   a lid component arranged on the optical module, wherein the first magnetic component is configured to extend to the optical module by passing above the first optical waveguide component and is coupled to or integrated with the lid component; and
   an integrated circuit mounted on the first substrate.

18. The optical mounting board according to claim 17, wherein:
   the first magnetic component comprises a magnetic metal component comprising a soft magnetic material;
   the optical module comprises a plurality of optical modules; and
   the lid component is arranged around the plurality of optical modules.

19. The optical mounting board according to claim 18, further comprising a heat dissipation structure in the lid component or the first magnetic component.

20. The optical mounting board according to claim 17, wherein:
   the first magnetic component comprises a magnetic metal component comprising a soft magnetic material and a permanent magnet component comprising the hard magnetic material;
   the optical module comprises a plurality of optical modules; and
   the lid component is arranged around the plurality of optical modules.

21. The optical mounting board according to claim 17, wherein:
   the first magnetic component comprises a permanent magnet component comprising the hard magnetic material;
   the optical module comprises a plurality of optical modules; and
   the lid component is arranged around the plurality of optical modules.

22. The optical mounting board according to claim 17, further comprising:
   a second substrate on which the first substrate is mounted and which is electrically connected to the first substrate, wherein the first magnetic component is disposed on a side of the first optical connector facing the second substrate, and is mounted on the second substrate.

* * * * *